US011520067B2

(12) United States Patent
Price

(10) Patent No.: US 11,520,067 B2
(45) Date of Patent: Dec. 6, 2022

(54) NUCLEAR RADIATION MONITORING APPARATUS AND METHOD

(71) Applicant: Symetrica Limited, North Baddesley (GB)

(72) Inventor: Andrew Robert Price, North Baddesley (GB)

(73) Assignee: Symetrica Limited, North Baddesley (GB)

( * ) Notice: Subject to any disclaimer, the term of this patent is extended or adjusted under 35 U.S.C. 154(b) by 0 days.

(21) Appl. No.: 16/832,394

(22) Filed: Mar. 27, 2020

(65) Prior Publication Data
US 2020/0309972 A1 Oct. 1, 2020

(30) Foreign Application Priority Data
Mar. 29, 2019 (GB) ...................................... 1904397

(51) Int. Cl.
*G01T 3/06* (2006.01)
*G01T 1/17* (2006.01)
(52) U.S. Cl.
CPC . *G01T 3/06* (2013.01); *G01T 1/17* (2013.01)
(58) Field of Classification Search
CPC .................................... G01T 1/17; G01T 3/06
See application file for complete search history.

(56) References Cited

U.S. PATENT DOCUMENTS 5,557,108 A * 9/1996 Tumer ................. G01N 23/204
250/390.02
7,547,887 B2 6/2009 Ramsden et al.
(Continued)

FOREIGN PATENT DOCUMENTS

GB 2 424 065 A 9/2006
GB 2 456 302 A 7/2009
(Continued)

OTHER PUBLICATIONS

Meng, L. J., and D. Ramsden. 2000. "An Inter-Comparison of Three Spectral-Deconvolution Algorithms for Gamma-Ray Spectroscopy." IEEE Transactions on Nuclear Science 47 (4): 1329-36.
(Continued)

*Primary Examiner* — David P Porta
*Assistant Examiner* — Djura Malevic
(74) *Attorney, Agent, or Firm* — Renner, Otto, Boisselle & Sklar, LLP

(57) ABSTRACT

A nuclear radiation monitoring apparatus comprising: communication circuitry configured to receive nuclear radiation data generated by a nuclear radiation detector, the nuclear radiation data being indicative of nuclear radiation emitted from each of a plurality of portions of an object and detected by the nuclear radiation detector; classification circuitry configured to classify the detected nuclear radiation using the nuclear radiation data; intensity determination circuitry configured to determine a value of an intensity parameter indicative of an intensity of the classified nuclear radiation for each portion of the object using the nuclear radiation data; visualisation data generation circuitry configured to generate visualisation data indicative of the classification of the classified nuclear radiation and, for each portion of the object, visualisation data indicative of the portion of the object and the determined intensity parameter value of the portion of the object; and display output circuitry configured to output the generated visualisation data for display.

10 Claims, 9 Drawing Sheets

(56) References Cited

U.S. PATENT DOCUMENTS

| | | | | |
|---|---|---|---|---|
| 8,294,114 | B2* | 10/2012 | Chandrasekharan | G01T 3/00 250/391 |
| 8,338,795 | B1* | 12/2012 | Mascarenhas | G01T 3/003 250/391 |
| 9,562,866 | B2 | 2/2017 | Morton | |
| 10,565,429 | B2* | 2/2020 | Chukka | G06K 9/6277 |
| 10,973,486 | B2* | 4/2021 | Sjöstrand | G06V 10/507 |
| 2004/0258198 | A1* | 12/2004 | Carver | G01V 5/0041 378/57 |
| 2006/0284094 | A1* | 12/2006 | Inbar | G01V 5/0091 250/359.1 |
| 2007/0096036 | A1* | 5/2007 | Kang | G01N 23/04 250/390.04 |
| 2009/0294686 | A1* | 12/2009 | Chandrasekharan | G01V 5/0016 250/391 |
| 2011/0193711 | A1* | 8/2011 | Faugier | G01V 5/0091 340/600 |
| 2014/0321588 | A1* | 10/2014 | Gozani | G01T 3/00 376/154 |
| 2014/0361186 | A1* | 12/2014 | Chandrasekharan | G01T 3/06 250/390.11 |
| 2015/0330917 | A1* | 11/2015 | Morton | G21K 1/043 378/57 |

FOREIGN PATENT DOCUMENTS

| | | |
|---|---|---|
| GB | 2463707 A | 3/2010 |
| GB | 2504771 A | 2/2014 |
| WO | WO-2012160511 A1 * | 11/2012 ........... G01R 33/481 |

OTHER PUBLICATIONS

Lo Presti C. A. et al. 2006. "Baseline suppression of vehicle portal monitor gamma count profiles: A characterization study". Nuclear Instruments and Methods in Physics Research A 562 (2006) 281-297.

Examination Report issued by the European Patent Office for corresponding European Regional Patent Application No. 20 166 349.9.

* cited by examiner

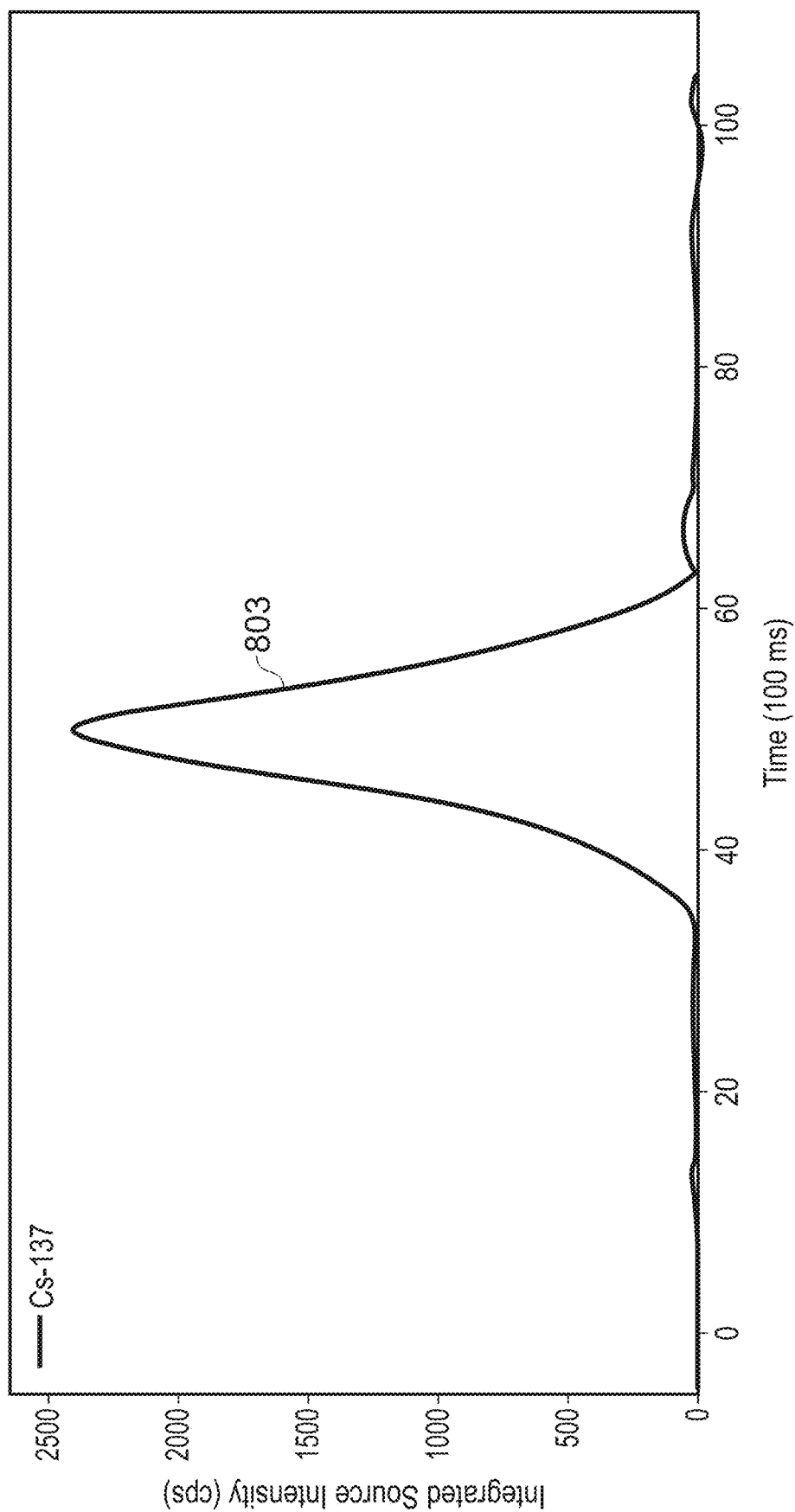

11,520,067 B2

NUCLEAR RADIATION MONITORING APPARATUS AND METHOD

This application claims priority to British Patent Application No. 1904397.5 filed on Mar. 29, 2019, which is hereby incorporated herein by reference.

BACKGROUND

Field of the Disclosure

The present disclosure relates to a nuclear radiation monitoring apparatus and method.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

There is currently a widespread use of radiation portal monitors (RPMs) at Points of Entry (POEs) into countries. These include drive through RPMs for both containerised and non-containerised cargo. Air-freight and rail-freight RPMs are also used at border crossing points in order to detect any undeclared radioactive materials concealed in cargo. In particular, such RPMs serve to help detect the presence of illicit Special Nuclear Materials (SNM). RPMs typically comprise a number of nuclear radiation detectors (e.g. gamma ray and/or neutron detectors) through which nuclear materials can be detected and classified based on the radiation emitted by such materials.

When the radiation detected at an RPM indicates the presence of a potential illicit nuclear material in cargo, it is necessary to subject the cargo to a further, detailed inspection (e.g. using a hand-held radiation monitor). In such cases, it is desirable to have some information about the location of the potential illicit nuclear material within the cargo. This allows the further inspection to be carried out quickly and efficiently (especially for large containers or vehicles, for example, which would otherwise take a long time to search). In particular, it is desirable for such information to be generated and provided to an RPM operator using the data generated by the RPM.

SUMMARY

The present disclosure is defined by the claims.

The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 9 demonstrates how the panel count rate of a detector panel changes over time when a vehicle containing a gamma-ray source travels past the detector panel.

DESCRIPTION OF THE EMBODIMENTS

Figure 1:
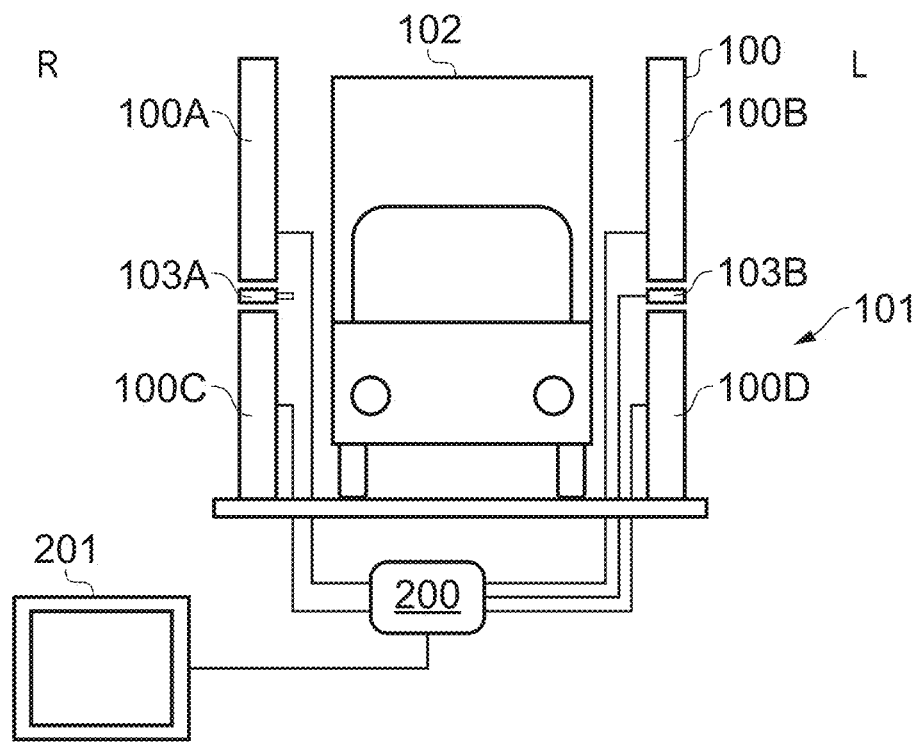
FIG. 1 schematically shows a Radiation Portal Monitor (RPM) according to an embodiment.

Referring now to the drawings, wherein like reference numerals designate identical or corresponding parts throughout the several views.

The present technique relates to determining the distribution of nuclear material within cargo based on nuclear data generated by a RPM and indicating that distribution in a simple, graphical form to an operator of the RPM. In an embodiment, gamma-ray and neutron data are collected by radiation detectors mounted within the RPM (e.g. mounted on each side of the road or rail along which the cargo travels through the RPM). The data is first processed to identify and classify the nature of the radiation. In particular, naturally occurring radiation is distinguished from radiation emitted by potentially threatening radioisotopes and/or other neutron-emitting materials. Observed radiation intensity that is recorded as the cargo passes through the portal is then mapped onto an image or representation of the profile of cargo (e.g. onto an image or representation of the vehicle or container within which the cargo is located).

This allows the location of potentially threatening nuclear materials within the cargo to be identified by the RPM operator, thereby helping them to conduct the detailed inspection efficiently, quickly and reliably (since they know where to look).

FIG. 1 shows a Radiation Portal Monitor (RPM) 101 according to an embodiment. The RPM comprises a nuclear radiation detector 100. The nuclear radiation detector 100 comprises a plurality nuclear radiation detector panels 100A to 100D (which form respective portions of the nuclear radiation detector 100). Panels 100A and 100C form a right side R of the detector 100 and panels 100B and 100D form a left side L of the detector 100. The right R and left L sides of the detector 100 are placed apart (e.g. approximately 4 metres apart) on either side of a road so as to allow a vehicle 102 passing through the RPM to travel between the right R and left L sides of the detector 100. The panels of each of the R and L sides of the detector house one or more gamma ray detectors and one or more neutron detectors (thereby allowing gamma radiation and neutron radiation to be detected at each of the R and L sides of the vehicle).

The gamma-ray and neutron detectors are passive instruments that respond, respectively, to gamma-ray and neutron emissions emanating from both the cargo and the surrounding environment. A dual-sided (in particular, a R and L sided) detection system is presented as an example in FIG. 1. However, the present technique is applicable to other possible arrangements of detectors, including, but not limited to, single-sided deployments (e.g. R side or L side only) or multi-sided deployments (e.g. R and L side, as shown in FIG. 1). In one example, the detector 100 may comprise detector panels above and/or below the cargo in addition to or instead of detectors panels at the L and R sides of the cargo. The cargo being scanned is not limited to containerised cargo in a road vehicle, but could equally comprise pedestrian traffic, air-freight, rail-freight, non-containerised cargo, automobiles, etc. It will be appreciated that, when the cargo is carried using an alternative method, the example RPM of FIG. 1 will be adjusted accordingly (e.g. for rail freight, the R and L sides of the detector 100 will be either side of a railway rather than a road).

Each gamma-ray detector is configured to record data indicative of an energy-loss spectrum of gamma radiation (gamma-ray spectrum) over a given time interval. This data may be referred to as gamma-ray spectrum data. Each gamma-ray detector may be, for example, a plastic scintillator detector (in particular, a polyvinyl-toluene scintillator detector) or a crystal scintillator detector. Each neutron detector is configured to record data indicative of a flux of incident neutrons over a given time interval. This data may be referred to as neutron data Suitable gamma-ray and neutron detectors are known in the art and are therefore not discussed in detail here. The gamma-ray spectrum data and neutron data of the nuclear radiation detector 100 together form nuclear radiation data.

Each of the panels 100A to 100D is in data communication with a nuclear radiation monitoring apparatus 200 so as to allow the generated nuclear radiation data to be provided to the nuclear radiation monitoring apparatus 200. Visualisation data generated by the nuclear radiation monitoring apparatus 200 is then output to a display apparatus 201 (e.g. monitor comprising a liquid crystal display (LCD) or similar for displaying images) for display.

The RPM also comprises a vehicle detection apparatus for detecting when a vehicle has entered the RPM. In this example, the vehicle detection apparatus has a pair of beam break instruments, each pair comprising a beam emitter which emits a light beam and a beam detector which detects that light beam. Beam emitters and detectors which perform such a function are known in the art and are therefore not discussed in detail here. The light beam is a laser beam, for example. One pair of beam break instruments is positioned at the entrance to the RPM and one pair of bream break instruments is positioned at the exit of the RPM. The distance d between each pair of beam break instruments is known in advance. FIG. 1 shows the pair of beam break instruments at the exit of the RPM (exit beam break pair). The exit beam break pair includes beam emitter 103A and beam detector 103B. Although not shown, a similar arrangement (entrance beam break pair) is present at the entrance to the RPM. The respective positions of the pairs of beam break instruments need not necessarily be at the entrance and exit of the RPM. Rather, they may be at different positions of the RPM in the direction of travel of the vehicle, as long as the distance d between the pairs is known. It will be appreciated that other ways of detecting the presence or not of a part of the vehicle 102 at a certain position along the RPM could also be used instead of the pairs of beam break instruments.

In the example of FIG. 1, the beam emitter 103A and detector 103B of the exit beam break pair are aligned with the exit of the detector 100 such that, when a portion of the vehicle is aligned with the exit of the detector 100, the light beam (second light beam in the direction of travel of the vehicle 102) is blocked by that portion of the vehicle and prevented from reaching the beam detector 103B. Furthermore, the beam emitter and detector of the entrance beam break pair are aligned with the entrance to the detector 100 such that, when a portion of the vehicle is aligned with the entrance to the detector 100, the light beam (first light beam in the direction of travel of the vehicle 102) is blocked by that portion of the vehicle and prevented from reaching the beam detector. As the vehicle proceeds through the RPM, the second light beam is blocked at a time t after the first light beam. The vehicle speed v can therefore be estimated as:

$$v = d/t \quad (1)$$

In an embodiment, the beam detector of each beam break pair is in data communication with the nuclear radiation monitoring apparatus 200. When a beam detector detects that it is no longer receiving a light beam from its corresponding beam emitter, it transmits a beam break signal to the nuclear radiation monitoring apparatus 200. The controller 207 of the nuclear radiation monitoring apparatus 200 is thus able to determine the time t as the time between receiving the beam break signal from the beam detector of each beam break pair. The distance d is stored in the storage medium 208 of the nuclear radiation monitoring apparatus in advance. The controller 207 is thus able to determine the estimated speed of the vehicle v using equation (1).

In an embodiment, one of the beam break pairs is used to determine whether or not a vehicle is within the RPM (and therefore whether recorded nuclear radiation data from the nuclear radiation detector 100 should be used to generate visualisation data for that vehicle). For example, the final bream break pair along the direction of travel of the vehicle 102 (e.g. the pair comprising beam emitter 103A and beam detector 103B at the exit of the RPM 101) may be used. When the light beam of this beam break pair is broken, the beam detector of the beam break pair transmits a beam break signal to the nuclear radiation monitoring apparatus 200. In response to this, the controller 207 determines that a vehicle has entered the RPM. The controller 207 thus initiates the generation of visualisation data using the nuclear radiation data recorded by the nuclear radiation detector. At a later time, when the light beam of the beam break pair becomes unbroken, the beam detector of the beam break pair stops transmitting the beam break signal to the nuclear radiation monitoring apparatus 200. In response to this, the controller 207 determines that the vehicle has left the RPM. The controller 207 thus completes the generation of visualisation data using the nuclear radiation data recorded by the nuclear radiation detector. The generated visualisation data is then associated with the vehicle and displayed in the way described below.

Figure 2:
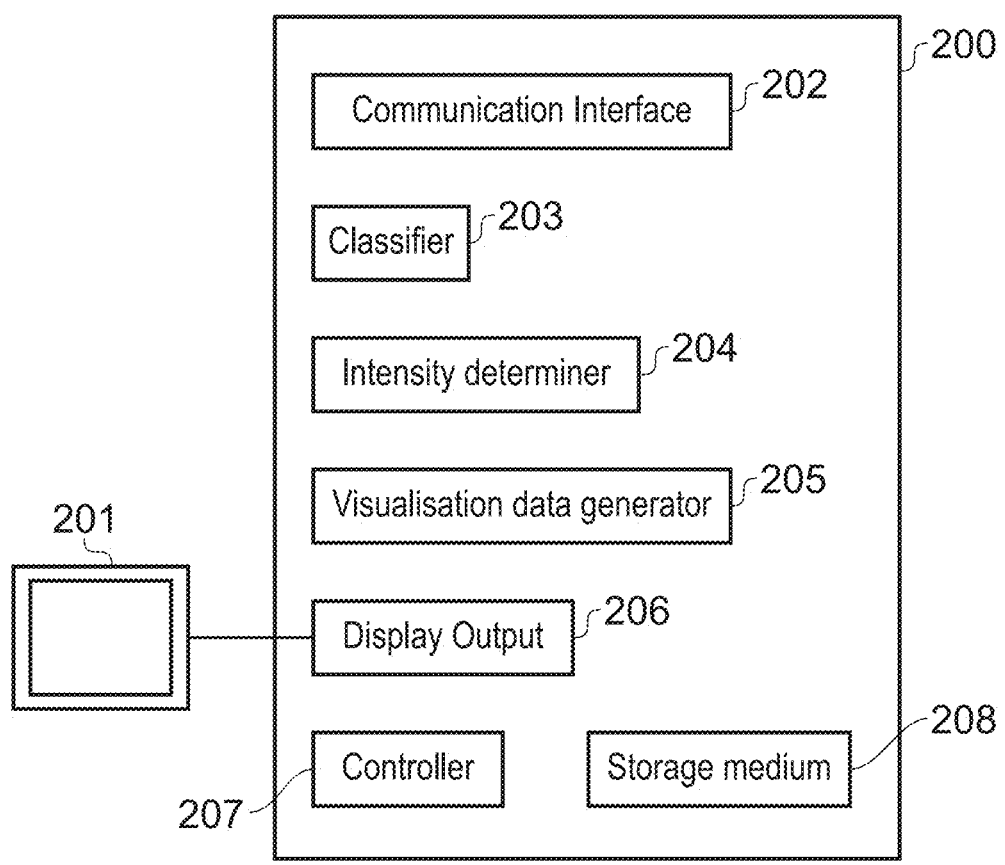
FIG. 2 schematically shows a nuclear radiation monitoring apparatus according to an embodiment.

As shown in FIG. 2, the nuclear radiation monitoring apparatus 200 comprises a communication interface 202, a classifier 203, an intensity determiner 204, a visualisation data generator 205, a display output 206, a controller 207 and a storage medium 208. The communication interface 205 is for sending electronic information to and/or receiving electronic information from the detector 100 (in particular, for receiving nuclear radiation data from the detector 100). The communication interface 202 is also able to receive the signals output by the beam detector (e.g. beam detector 103B) of each beam break pair. The display output 206 is for sending electronic information to the display apparatus 201 for display of that electronic information (in particular, for sending visualisation data generated by the visualisation data generator 205 to the display apparatus 201 for display of that visualisation data). The storage medium 208 (e.g. in the form of a hard disk drive, solid state drive, tape drive or the like) is for long-term storage of electronic information. It will be appreciated that, rather than the nuclear radiation monitoring apparatus 200 comprising the storage medium 208, the storage medium 208 may be located in a separate apparatus (e.g. cloud server or local server) accessible to the nuclear radiation monitoring apparatus 200 over a network or the like (e.g. via the communication interface 202). The classifier 203, intensity determiner 204, visualisation data generator 205 and controller 207 are implemented by one or more processors (not shown) for processing electronic instructions and memory (not shown) for storing the electronic instructions to be processed and input and output data associated with the electronic instructions. The controller 207 controls the operation of each of the communication interface 202, classifier 203, intensity determiner 204, visualisation data generator 205, display output 206 and storage medium 208. The controller 206 may also control, via the communication interface 202, the operation of the detector 100 (e.g. by controlling the communication interface 202 to send a control signal to the detector to start and stop detection of nuclear radiation). Each of the communication interface 202, classifier 203, intensity determiner 204, visualisation data generator 205, display output 206, controller 207 and storage medium 208 are implemented by appropriate circuitry, for example.

In the embodiment of FIG. 1, when the vehicle enters the portal and the front of the vehicle aligns with the front of the detector 100, the beam detector 103B provides a beam break signal to the data processing apparatus 200. In response, the controller 207 controls the detector 100 to start associating nuclear radiation data recorded by the nuclear radiation detector 100 with the vehicle which has entered the portal. By "association", it is meant that the recorded nuclear radiation data will be used to generate visualisation data associated with the vehicle. This is because the presence of the vehicle within the RPM means that the recorded nuclear radiation data will be generated from nuclear radiation (in particular, gamma-rays and neutrons) including that emitted from the vehicle. Nuclear radiation data is recorded by the detector 100 during each of a plurality of successive time intervals (capture intervals) as the vehicle travels past the detector 100 and is provided to the nuclear radiation monitoring apparatus 200 via communication interface 202.

The speed v at which the vehicle travels past the detector 100 and the capture interval duration are determined so as to provide a balance between detector performance and vehicle throughput. In one example, the driver of the vehicle is instructed to drive the vehicle through the RPM at a speed v of 8 km/hr and the capture interval duration is 100 milliseconds (ms). The detector 100 is reset at the beginning of each capture interval so as to record nuclear radiation data corresponding to the portion of the vehicle passing the detector 100 during that capture interval.

The classifier 203 receives the nuclear radiation data captured during each capture interval. In an embodiment, the nuclear radiation data from a plurality of adjacent time intervals is aggregated to improve the spectral classification performance. In one example, the nuclear radiation data of successive sets of plural adjacent capture intervals is aggregated. The successive sets of plural adjacent capture intervals over which the nuclear radiation data is aggregated are referred to as aggregated capture intervals. This means that, for example, for when the capture interval duration is 100 ms and there are three plural adjacent capture intervals in a set over which nuclear radiation data is aggregated, the aggregated capture interval has a duration of 300 ms. In the following description, the terms "capture interval" and "aggregated capture interval" are used interchangeably (since the aggregated capture interval is equivalent to a longer capture interval in terms of processing of the captured nuclear radiation data).

For neutron data captured during each capture interval, the classifier 203 aggregates the neutron count detected by each neutron detector in order to determine a total neutron count for that capture interval. The total neutron count is compared to a predetermined threshold. If the total neutron count exceeds the predetermined threshold, then it is determined that the vehicle contains a neutron source which is a potential threat and which must be investigated. If the total neutron count does not exceed the predetermined threshold, then it is determined that the vehicle does not contain a neutron source which is a potential threat and which must be investigated. The predetermined threshold neutron count is determined in advance with reference to the natural background count rate and stored in the storage medium 208 so as to allow potential threat neutron sources to be detected.

For gamma-ray data captured during each capture interval, the classifier 203 combines the gamma-ray spectra detected from each gamma-ray detector in order to generate a higher intensity, combined gamma-ray spectrum (the data representing the combined gamma-ray spectrum is referred to as combined gamma-ray data). This allows the captured gamma radiation to be analysed even for a low gamma-ray source intensity. In order to maintain a combined gamma-ray spectrum of good quality for use in the subsequent signal processing stages, each gamma-ray detector is identical and is continuously stabilised and calibrated in order to avoid the impact of changing environmental conditions (e.g. temperature fluctuations). The combining of gamma-ray data from multiple detectors is known in the art (see e.g. [1] and [2]) and is therefore not described in detail here.

In an embodiment, the classifier 203 then performs spectral-deconvolution processing on the combined gamma-ray data using a technique such as that described in [3] and [4]. Such spectral-deconvolution processing is used, for example, when each gamma-ray detector is a large volume plastic detector (e.g. a polyvinyl-toluene (PVT) detector). Such large volume plastic detectors are often used in RPMs because they are relatively inexpensive compared with crystal scintillation spectrometers that offer better spectral-resolution. Deconvolution of the combined gamma-ray data improves the feature definition of the combined gamma-ray spectrum when such plastic detectors are used, thereby providing improved classification performance of the system.

Figure 3:
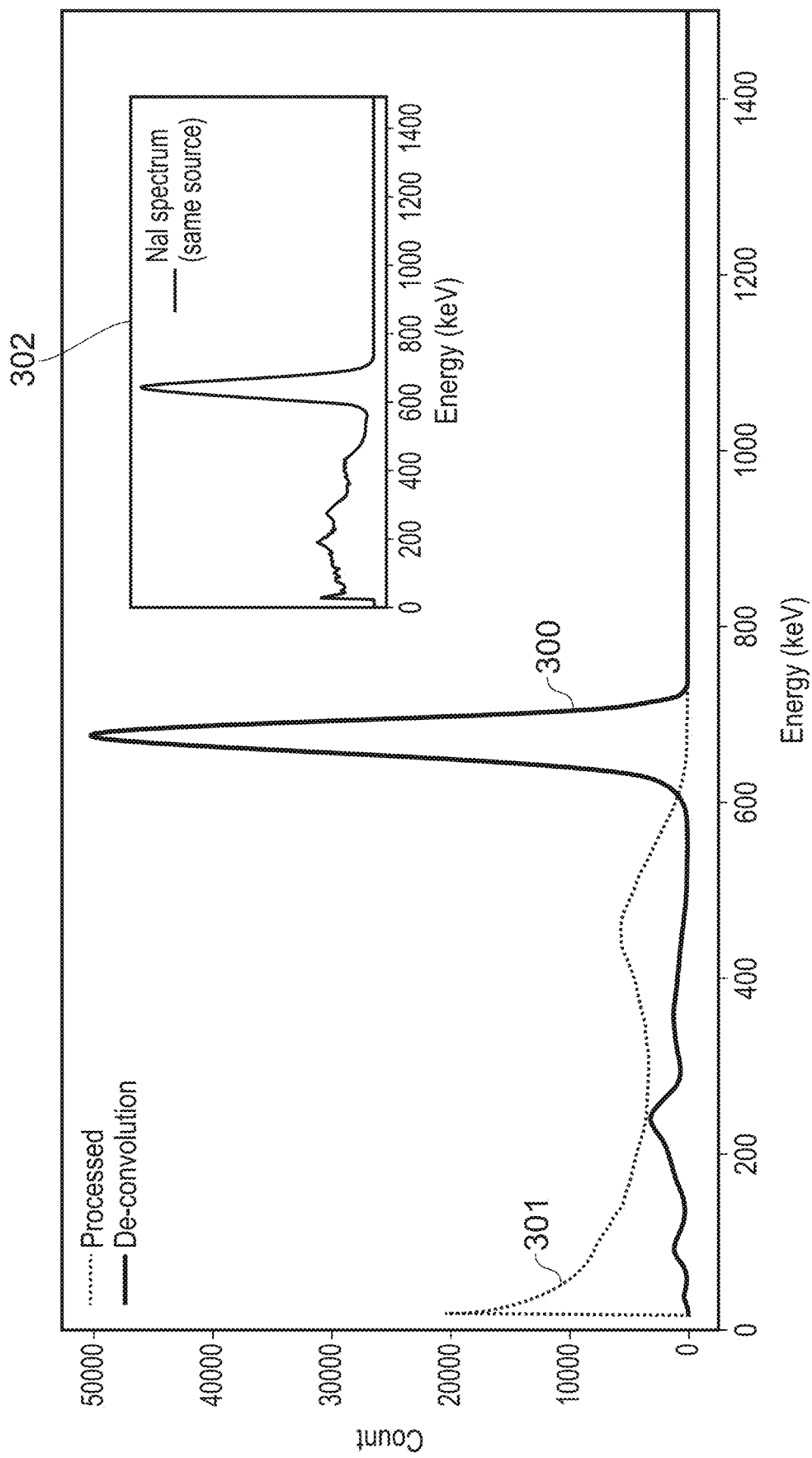
FIG. 3 shows an improvement in the quality of spectral information provided by a large plastic detector using spectral deconvolution.

The improvement in the quality of the gamma-ray spectral information provided by a plastic detector is illustrated in FIG. 3, which shows the most likely incident spectrum 300 of Cs-137 generated by subjecting the (background subtracted) raw energy-loss spectrum 301 recorded by a plastic detector to spectral-deconvolution. Also shown is the better defined energy-loss spectrum 302 of Cs-137 recorded by a NaI crystal detector. It will be appreciated that the spectral-deconvolution process allows the spectral definition of the energy-loss spectrum recorded by the plastic detector to approach that of the energy-loss spectrum recorded by the NaI crystal detector.

In an embodiment, the spectral deconvolution process is performed in two separate classification tasks.

As a first task, as the vehicle 102 travels past the detector, the classifier 203 generates a temporal profile of the spectral features (e.g. spectral peak positions) of the incident radiation recorded for each aggregated capture interval. That is, for each aggregated capture interval (e.g. every 300 ms), the spectrum captured during that interval is subjected to the spectral deconvolution process so as to allow spectral features for that interval to be determined. The spectral features of all intervals are then combined to generate a temporal profile of the spectral features as the vehicle travels past the detector 100 (the temporal profile showing how the spectral features change over time between successive aggregated capture intervals). The temporal profile is used by the visualisation data generator 205 to generate the visualisation data (as will be explained). The analysis of gamma-ray spectra to determine the presence of predetermined spectral features (e.g. spectral peak positions) is known in the art and will therefore not be discussed in detail here. In an embodiment, the first task is carried out for each aggregated capture interval on the combined gamma-ray spectrum of the gamma-ray detectors of each detector panel 100A to 100D individually. Thus, a separate temporal profile of spectral features is generated for each individual detector panel. This allows improved spatial resolution of the displayed visualisation data, as will be explained.

As a second task, once the vehicle transit past the detector 100 is complete, the classifier 203 is used again to analyse an aggregate spectrum generated from the recorded spectrum of all capture intervals (and all detector panels) in which the incident radiation is determined to have a significant signal (e.g. a count rate above a predetermined threshold). This second identification task uses a larger number of iterations of the spectral deconvolution method than that used in the first task to further enhance the resolution of the spectral features, thereby providing improved performance in classifying the nature of the detected radiation (e.g. whether it is NORM or non-NORM). The results of this latter identification are used by the intensity determiner 204 to associate the spectral features in the temporal profile generated in the first task with a particular classification of nuclear radiation. This allows a temporal profile of each nuclear radiation classification as the vehicle travels past the detector 100 to be determined.

It is noted that by having the first task use a lower number of spectral deconvolution iterations than the second task, it is possible for the spectral features of the spectrum captured during each aggregated capture interval to be quickly determined (e.g. in real time or near real time on typical computing hardware used in a present-day embodiment) at a sufficient level of definition for generation of meaningful visualisation data. The second task then uses a higher number of spectral deconvolution iterations in order to achieve a sufficient level of definition for reliable classification of the nuclear radiation. However, since this higher number of spectral deconvolution iterations is only applied to one set of data (i.e. the aggregated spectrum of all capture intervals rather than the spectrum of each capture interval individually, as in the first task), the processing time is kept within an acceptable limit. The separation of the first and second tasks with, respectively, a lower and higher number of spectral deconvolution iterations thus allows sufficient processing of the data to generate useful visualisation data whilst keep the processing time low. This is important when the RPM 101 is installed at a POE, for example, in which the cargo throughput needs to be as high as possible whilst also ensuring that any potentially threatening materials are detectable.

In an embodiment, during the second task, the classifier 203 classifies between NORM and non-NORM gamma-ray spectra. Data indicative of a number of predetermined NORM gamma-ray spectral features (e.g. spectral peak position) associated with respective predetermined non-threatening materials which are likely to be found in cargo (e.g. sanitary ware, fertilizer and the like) are stored in the storage medium 208 and compared with the gamma-ray spectrum aggregated from all detector panels and all capture intervals. Techniques for comparing gamma-ray spectra with one or more predetermined spectral features are known in the art and are therefore not discussed in detail here. In an embodiment, in the case that the aggregated gamma-ray spectrum has only one or more of the predetermined NORM spectral features, it is determined that the vehicle contains only non-threatening, NORM material. On the other hand, in the case that the aggregated gamma-ray spectrum has one or more spectral features which do not match any of the predetermined NORM spectral features, it is determined that the vehicle may contain a potentially threatening, non-NORM material. The vehicle can then be detained for a more detailed inspection used a handheld nuclear radiation detector, for example. Furthermore, because the non-NORM spectral feature(s) will have been detected during the first classification task and used to generate the visualisation data, a location of the non-NORM material may be determined using the visualisation data (as will be explained).

In an embodiment, prior to the vehicle entering the RPM, the nuclear radiation detector collects a sample of the background nuclear radiation (e.g. a background neutron count and/or a background gamma-ray spectrum). Data representative of the captured background nuclear radiation is stored in the storage medium 208. Nuclear radiation data captured in each capture interval whilst the vehicle travels through the RPM is then treated as having two primary components. These are (1) a measure of the known background radiation and (2) a measure of any radiation emitted from the materials comprised within the vehicle and its cargo. In an embodiment, the background radiation component is removed so that the radiation classification and visualisation data generation is carried out on the component corresponding to the radiation emitted by the vehicle and its cargo only (this may be referred to as emitted radiation component). To achieve a separation of the emitted radiation component from the background radiation component, the nuclear radiation data captured during each capture interval is processed by the classifier 203 to remove the background radiation component during spectral deconvolution and the subsequent determination of spectral features. For the neutron data, the background count rate is largely unaffected by the presence of the vehicle and thus a background count rate recorded by the neutron detector(s) prior to entry of the vehicle to the RPM can simply be subtracted from the neutron data of each capture interval. For the gamma-ray data, however, background gamma radiation recorded prior to entry of the vehicle to the RPM is attenuated by the presence of the vehicle and its cargo. Before subtraction is performed, an attenuated background gamma-ray spectrum is estimated. Background gamma-ray spectrum attenuation estimation of this kind is known in the art (see [5]) and is therefore not discussed in detail here. This estimated attenuated (suppressed) background gamma-ray spectrum is then subtracted from the gamma-ray spectrum recorded during each capture interval. Compensating for the background nuclear radiation in this way provides improved classification and visualisation performance.

FIGS. 4A to 4D show a vehicle 102 travelling through an RPM 100 between the R and L sides of detector 100 at four respective successive capture intervals occurring between the vehicle entering the RPM and leaving the RPM. It will be appreciated that, in reality, there may be a much larger number of capture intervals between the vehicle entering and leaving the RPM. However, a small number of intervals are shown here for clarity of explanation.

The vehicle first enters the RPM through entrance 506. When the front 504 of the vehicle is aligned with exit 505 of the detector 100, the light beam emitted from the beam emitter 103A is blocked (by the vehicle) from reaching the beam detector 103B. In response to this, the nuclear radiation monitoring apparatus 200 begins associating incident nuclear radiation recorded by the detector 100 during successive capture intervals with the vehicle.

Figure 4A:
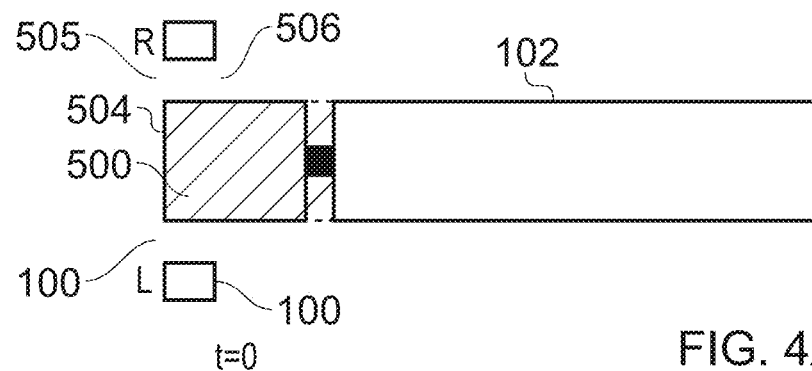
FIGS. 4A to 4D schematically shows a vehicle travelling through the RPM.

FIG. 4A shows the position of the vehicle during a first capture interval. During the first capture interval, the detector 100 records incident nuclear radiation whilst a first portion 500 of the vehicle travels past the detector 100. The first capture interval starts at time t=0.

Figure 4B:
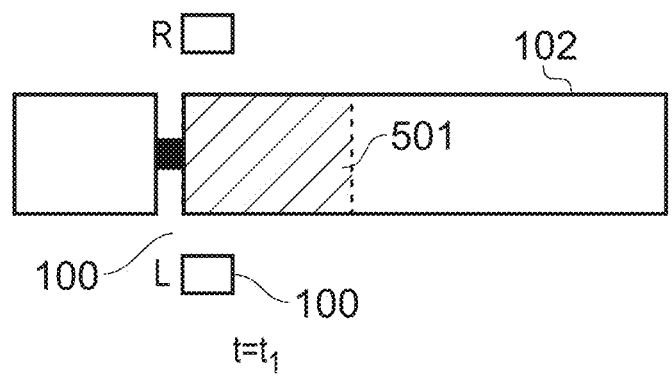

FIG. 4B shows the position of the vehicle during a second capture interval. During the second capture interval, the detector 100 records incident nuclear radiation whilst a second portion 501 of the vehicle travels past the detector 100. The second capture interval starts at time $t=t_1$.

Figure 4C:
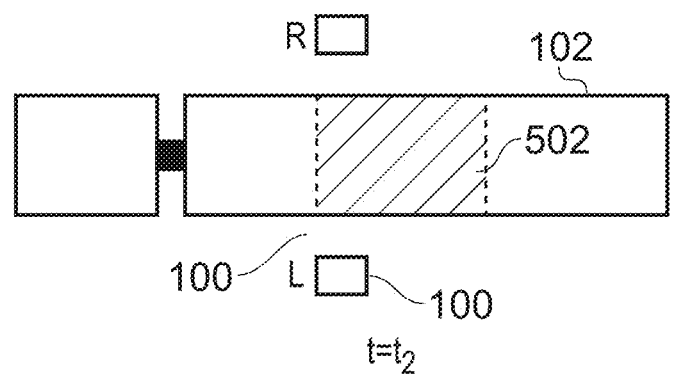

FIG. 4C shows the position of the vehicle during a third capture interval. During the third capture interval, the detector 100 records incident nuclear radiation whist a third portion 502 of the vehicle travels past the detector 100. The third capture interval starts at time $t=t_2$.

Figure 4D:
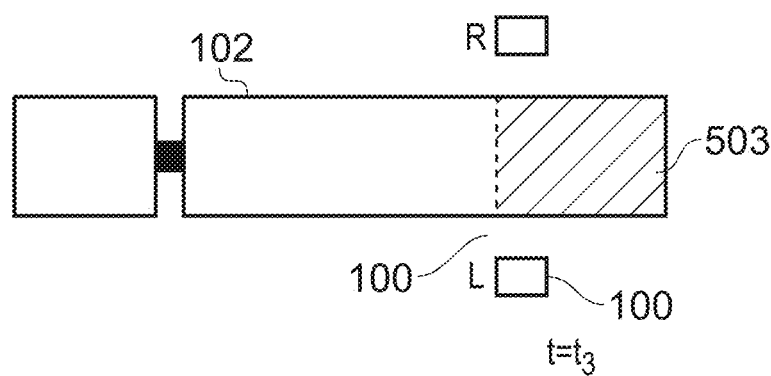

FIG. 4D shows the position of the vehicle during a fourth capture interval. During the fourth capture interval, the detector 100 records incident nuclear radiation whilst a fourth portion 503 of the vehicle travels past the detector 100. The fourth capture interval starts at time $t=t_3$.

After the fourth capture interval, the vehicle leaves the RPM. The light beam emitted by the beam emitter 103A is thus no longer blocked from reaching the beam detector 103B and, in response to this, the nuclear radiation monitoring apparatus 200 stops associating incident nuclear radiation recorded by the detector 100 during successive capture intervals with the vehicle. The fourth capture interval is therefore the final capture interval for the vehicle 102. It is noted that each of the vehicle portions 500, 501, 502 and 503 extends beyond the length of the detector 100 in the direction of vehicle travel since the vehicle 102 continues to move through the RPM 101 during each capture interval.

Figure 5:
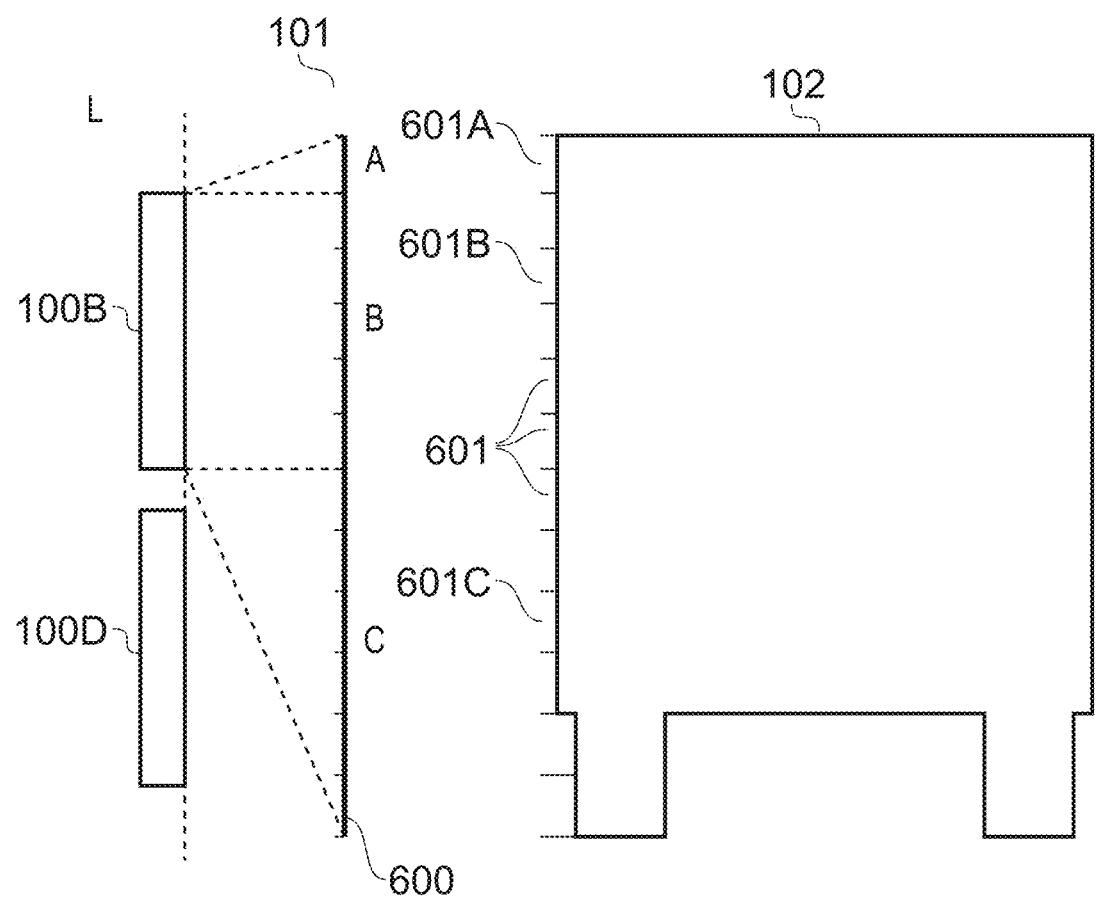
FIG. 5 schematically shows a partial cross section of the RPM as the vehicle travels through the RPM.

FIG. 5 shows a partial cross section of the RPM 101 as the vehicle 102 travels through the RPM past the detector 100. In this case, only the L side of the detector 101 is shown (for clarity of explanation). However, it will be appreciated that the R side of the detector 101 will also be present (on the opposite side of the vehicle) and that the following description of the L side of the detector also applies to the R side of the detector 101.

As previously mentioned, the L side of the detector comprises a plurality of detector panels. In this case, there are two detector panels 100B and 100D. However, there may be more than two panels. Alternatively, there may only be a single detector panel. Each panel comprises one or more gamma-ray detectors and one or more neutron detectors. Nuclear radiation data recorded by each of the gamma-ray detectors and neutron detectors during the transit of the vehicle through the RPM (as exemplified in FIGS. 4A to 4D) is provided to the nuclear radiation monitoring apparatus 200.

After the vehicle has passed through the RPM, the nuclear radiation data is processed by the classifier 203 to determine its characteristics. In an embodiment, for detected gamma radiation, the classifier identifies the characteristic energies at which the gamma radiation is emitted from its source. This information is used by the intensity determiner 204 to determine the value of a parameter indicative of the intensity of the gamma radiation detected at each panel during each capture interval. In an embodiment, the parameter for each panel is the total radiation count at that panel at the energies of one or more characteristic emission lines of the classified gamma-ray spectrum. For example, the count at each panel for the classified gamma-ray spectrum of Cs-137 shown in FIG. 3 would be the total of the counts detected by that panel at each energy at which a peak is found. In this case, the classified gamma-ray spectrum has a single peak at 662 keV, and thus the intensity at each panel for a particular capture interval is determined to be the count at that panel at 662 keV for that capture interval (if there is more than one peak, as occurs with the gamma-ray spectra of some other sources, then the intensity is determined to be the sum of the counts at the energies of each of those peaks). For detected neutrons, the neutron intensity for each panel is the previously detected neutron count at that panel. The total radiation count at the characteristic emission line energies (for gamma radiation) and the neutron count (for neutrons) may each be referred to more generally as an intensity parameter.

In an embodiment, for each capture interval, the intensity parameter values determined for each panel on a given side of the vehicle may be associated with the corresponding portion of the vehicle. For example, for the vehicle portion 500, 501, 502 or 503 corresponding to the current capture interval, the intensity parameter values associated with the L side of the vehicle portion are determined to be equal to the sum of the intensity parameter values determined for the panel(s) of the L side of the detector 100 and the intensity parameter values associated with the R side of the vehicle portion is determined to be equal to the sum of the intensity parameter values determined for the panel(s) of the R side of the detector 100. Thus, for example, when there is a plurality of detector panels on each side of the vehicle (e.g. as in FIG. 5, in which the L side of the detector 100 has two panels 100B and 100D and in which, although not shown, there is an identical setup at the R side of the detector 100), the intensity parameter values determined for each side of the vehicle may be determined by aggregating the intensity parameter values determined for each detector panel on that side (e.g. for the L side of the detector 100 in FIG. 5, if panel 100B detects an intensity parameter value of $N_1$ and panel 100D detects an intensity parameter value of $N_2$, then the L side intensity parameter value is $N_1+N_2$). The determined intensity parameter value of each side is then provided to the visualisation data generator 205.

To provide improved visualisation data, however, the intensity parameter value determined for each panel may be adjusted depending on the relative position of each detector panel and one or more sub-portions of the vehicle portion concerned. This is schematically illustrated in FIG. 5.

In FIG. 5, the intensity determiner 204 projects the intensity parameter values determined for each panel onto a virtual plane representing the side of the vehicle at which that panel is located. FIG. 5 shows this projection for panel 100B onto a virtual plane 600. For clarity of explanation, the virtual plane 600 is shown as being located separately to the L side of the vehicle 102. However, in reality, the distance between the panel 100B and virtual plane 600 actually approximates the distance between the panel 100B and the L side of the vehicle (this value may be a fixed value determined in advance, for example).

This virtual plane is separated into a number of sections. In this example, there are three sections A, B and C (it will be appreciated that a different number of sections may be used). In section B (the ends of which are aligned with the edges of the panel 100B in a vertical direction), the intensity parameter values are determined to be constant. In sections A and C (which have, respectively, a bottom end aligned with a top edge of the panel 100B in a vertical direction and a top end aligned with a bottom edge of the panel 100B), the intensity parameter values are reduced by a factor determined based on the size and location of the section. In this case, a factor of $1/r^2$ is used (where r is a distance between the top edge of the panel 100B and the virtual plane 600 and a distance between the bottom edge of the panel 100B and the virtual plane 600 for sections A and C, respectively).

A corresponding virtual plane is defined for each of the other panels on the L side, with suitably adjusted A, B and C sections. Thus, for panel 100D, the positions of the ends of each of the A, B and C sections on the virtual plane defined for the panel 100D are determined so that, again, the ends of the B section are aligned with the edges of the panel 100D in a vertical direction, a bottom end of the A section is aligned with a top edge of the panel 100D in a vertical direction and a top end of the C section is aligned with a bottom edge of the panel 100D). Furthermore, in section B, the intensity parameter values are determined to be constant. In sections A and C, the intensity parameter values are reduced by a factor determined based on the size and location of the section. For example, a factor of $1/r^2$ may again be used (where r is a distance between the top edge of the panel 100D and the virtual plane and a distance between the bottom edge of the panel 100D and the virtual plane 600 for sections A and C, respectively).

In an embodiment, rather than each intensity parameter value defined along the virtual plane of each panel being a count, each intensity parameter value may instead be a panel count rate.

The panel count rate for a panel is the sum of the counts from the detectors of that panel in each capture interval divided by the sum of the instrument measurement livetimes of those detectors. Using a panel count rate as an intensity parameter value rather than the count itself means that the intensity parameter values of different panels are comparable regardless of the number of active detectors in each panel. This provides improved resilience to instrument failure, since even if a detector in a panel fails, this is reflected in the calculation of the panel count rate (a failed detector will not record a count but will also have a zero instrument measurement live-time, thereby alleviating the risk of a large error in the panel count rate).

In an embodiment, all detectors of a certain type (e.g. gamma-ray detectors or neutron detectors) in the detector panels are identical. The panel count rates thus provide a measure of the relative distances of the detectors of each panel from the source of radiation without the need for further processing (if a system is deployed in which different detector types or volumes are deployed, then a further correction is required). The intensity determiner 204 projects the count rate data onto the virtual plane 600. The objective of the visualisation is to generate images that provide an intuitive comparison of the radiation profile on the two sides of the vehicle. For the images to be comparable, the relative intensities of the panel count rates must be maintained. The panel count rates of each panel are therefore divided by a number of divisions in a vertical dimension of the virtual surface 600. A vertical scan line sums to the total count rate of the panels on each side of the vehicle for a given capture interval. As described above, each divided panel count rate is constant for divisions at points that represent the detector(s) (e.g. section B in FIG. 5) and reduces with $1/r^2$ for divisions above and below the detectors (e.g. sections A and C in FIG. 5). In an embodiment, in order to make the imaging robust to rare but possible failures in the instrumentation, the total count rates on each side of the vehicle are further weighted by the number of active panels so as to alleviate the risk that the images become unbalanced if all detectors in a panel have failed.

Division of the panel count rates of each panel in the vertical dimension of the virtual surface 600 of that panel is demonstrated in FIG. 5. The virtual surface 600 is divided in the virtual direction into a plurality of sub-portions 601 of the vehicle. The panel count rate is then divided amongst these sub-portions 601 according to the above-discussed weighting (e.g. for panel 100B, a constant weighting for sub-portions 601B corresponding to section B of the surface 600 and a weighting which varies with $1/r^2$ for sub-portions 601A and 601C corresponding, respectively, to sections A and B of the surface) so that each sub-portion 601 is associated with a corresponding weighted fraction of the panel count rate and so that the total of the weighted fractions of the panel count rate is equal to the panel count rate. The weighted fractions of the panel count rate of each panel on each side of the vehicle (which may be further weighted depending on the total number of panels, as explained later) are then aggregated for each sub-portion 601 so as to determine a weighted fraction of the total count rate for each sub-portion 601 on that side. Thus, for example, if the panel count rate of panel 100B were $N_1$ and the panel count rate of panel 100D were $N_2$ and there were d sub-portions, then the $n^{th}$ sub-portion would be associated with a respective first weighted fraction $W_{1n}$ of $N_1$ (so that the total of the first weighted fractions $W_{1n}$ of all d sub-portions would be equal to $N_1$) and a second weighted fraction $W_{2n}$ of $N_2$ (so that the total of the second weighted fractions $W_{2n}$ of all d sub-portions would be equal to $N_2$). The weighted fraction of the total count rate of the $n^{th}$ sub-portion is then $W_{1n}+W_{2n}$.

It is noted that the size and location of the virtual plane 600 and the size and location of the sub-portions 601 on that virtual plane 600 are the same for each panel on a particular side of the vehicle (e.g. panels 100B and 100D). However, the weightings used for determining the weighted fraction of the panel count rate for each sub-portion 601 may be different for each panel, depending on that panel's location. For example, the weightings for a particular sub-portion 601 will be different for panels 100B and 100D in FIG. 5 because that sub-portion may be located in section B of the virtual plane of panel 100B (implying a constant weighting) but, simultaneously, in section A of the virtual plane of panel 100D (implying a weighting which varies with $1/r^2$.

This process is carried out separately on each side of the vehicle. The result is that each side of the vehicle is divided into portions 500, 501, 502 and 503 in a horizontal direction and each portion is further divided into sub-portions 601 in a vertical direction. Each sub-portion 601 is associated with a weighted fraction of the total count rate for both neutrons and gamma-rays on that vehicle side. This data is provided to the visualisation data generator 205 along with the nuclear radiation classification (e.g. whether or not a neutron source is present and whether or not any non-NORM gamma-ray emitting materials are present) as determined by the classifier 203.

It will be appreciated that multiple methods of determining the intensity parameter values of each sub-portion of a given portion of the vehicle based on the position of that sub-portion relative to the detector panel(s) on each side of the vehicle could be used. For example, a factor of $1/r^2$ could be applied to the value of the intensity parameter values measured at each detector panel based on the distance r measured from a reference point of that detector panel to the sub-portion concerned.

Figure 6:
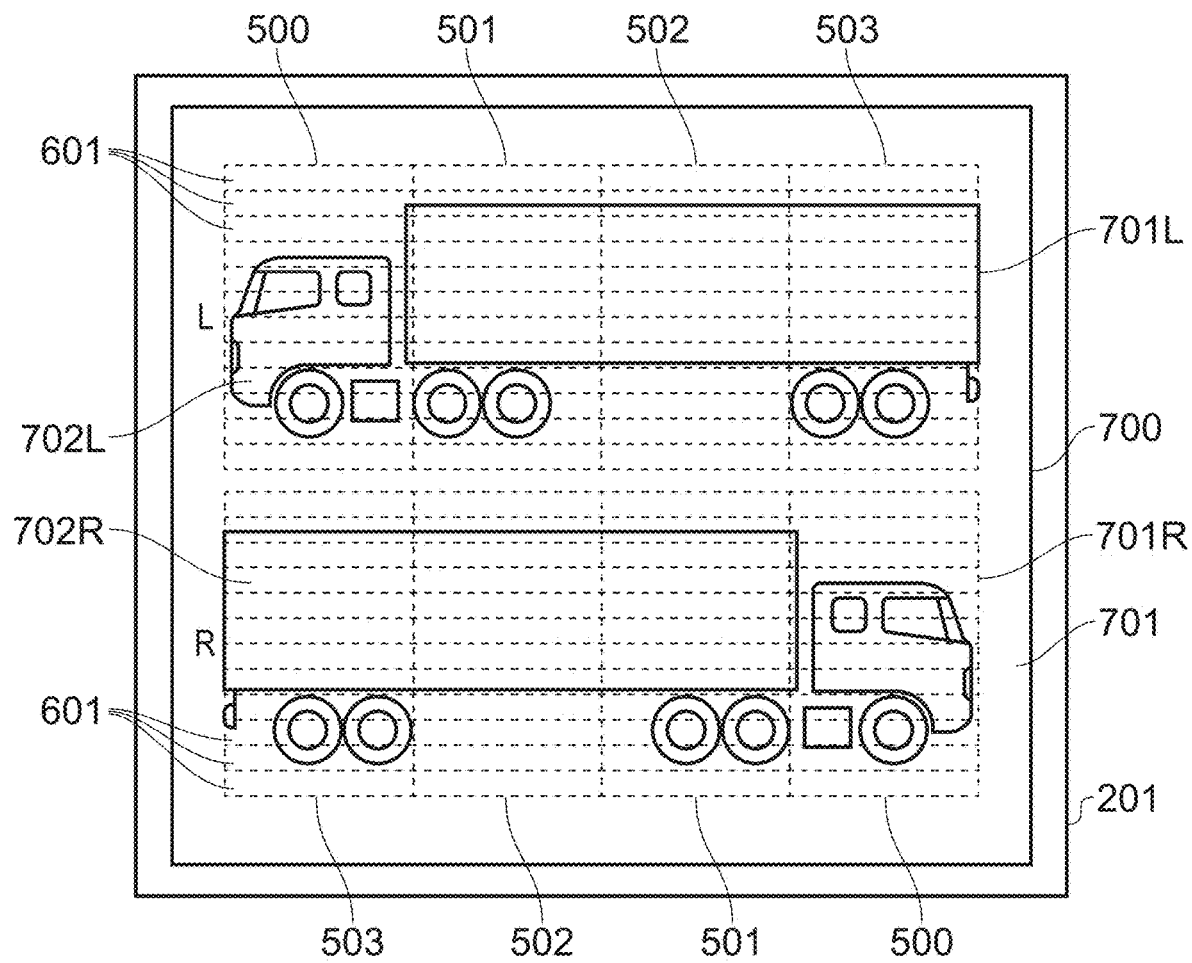
FIG. 6 schematically shows an example of visualisation data generated by the nuclear radiation monitoring apparatus.

FIG. 6 shows an example of visualisation data generated by the visualisation data generator 205 and displayed on an electronic display 700 (e.g. LCD) of a display apparatus 201 in the form of an image 701. The image 701 comprises a first portion 701L (L image portion) showing a schematic of the L side of the vehicle 102 and a second portion 701R (R image portion) showing a schematic of the R side of the vehicle 102. Each of the L and R image portions are visually divided into a plurality of regions each representative of a respective one of the vehicle portions 500 to 503 for which nuclear radiation was detected and processed for a respective capture interval. Each region is further visually divided into a plurality of sub-regions each representative of a respective one of the vehicle sub-portions 601. It will be appreciated, however, that if an intensity parameter value for each capture interval is determined on each side of the vehicle for the corresponding vehicle portion in its entirety without further dividing the vehicle portion into a plurality sub-portions 601, then the further visual division of each region into a plurality of sub-regions is omitted.

Each of the images 702L and 702R of the left and right sides of the vehicle used in the L and R image portions 701L and 701R, respectively, may be a schematic image of a generic vehicle (a truck, in this case), a photograph of the actual vehicle travelling through the RPM (captured by cameras (not shown) respectively located at the L and R sides of the RPM) or an X-ray image of the actual vehicle travelling through the RPM (captured by suitable X-ray equipment (not shown)). The use of X-ray images allows the visualisation data representative of the detected nuclear radiation emitted from the vehicle (as generated by the visualisation data generator 205) to be combined with X-ray data which provides information on the content within the vehicle, thereby helping to identify the item of cargo emitting the detected nuclear radiation.

The visualisation data generator 205 is able to visually position each region representing a respective one of the vehicle portions 500 to 503 at an accurate location relative to the images 702L and 702R based on the measured speed v at which the vehicle travels through the RPM.

In this embodiment, the vehicle speed v is assumed to be constant and is estimated using the time interval measured between break beam events for instruments separated by a known distance in the direction of travel (as previously described). However, another vehicle presence sensing apparatus may be used without loss of generality. For example, more sophisticated sensing may provide the vehicle speed as a function of time v(t) to account for any acceleration of the vehicle during the transit.

In this embodiment, the time interval $t_{total}$ between entry of the vehicle into the RPM and exit of the vehicle from the RPM is measured as the time interval between the breaking of the beam of the exit beam break pair as the vehicle enters the RPM (and breaks the beam) and the subsequent unbreaking of the beam of the exit beam break pair as the vehicle leaves the RPM (and stops breaking the beam). The time $t_i$ is the time within $t_{total}$ at which the $i^{th}$ capture interval is started (e.g. time $t_1$ is the time at which the $1^{st}$ capture interval corresponding to vehicle portion 500 is started, time $t_2$ is the time at which the $2^{nd}$ capture interval corresponding to vehicle portion 501 is started, etc.). It is noted that, when the start of the $1^{st}$ capture interval coincides with the start of $t_{total}$, $t_1=0$. The capture interval duration (e.g. a 300 ms aggregated capture interval has $t_{interval}=300$ ms) is denoted $t_{interval}$.

The estimated length $l_{total}$ of the vehicle is:

$$l_{total}=v \times t_{total}$$

The position $l_i$ along the vehicle at which the $i^{th}$ capture interval is started (and at which the vehicle portion corresponding to the $i^{th}$ capture interval thus begins) is:

$$l_i=v \times t_i$$

The length $l_{portion}$ along the vehicle of each vehicle portion (which thus defines the end of the vehicle portion corresponding to the $i^{th}$ capture interval) is:

$$l_{portion}=v \times t_{interval}$$

In an embodiment, the height h of each vehicle portion is assumed to be a fixed value (stored in the storage medium 208) for every vehicle travelling through the RPM (h being chosen in advance so as to approximate the height of most vehicles, e.g. heavy goods vehicles, travelling through the RPM). In another embodiment, h is determined individually for each vehicle passing through the RPM. This may be carried out using, for example, a laser beam distance measuring device or the like (not shown) mounted on a ceiling of the RPM to measure the distance $h_d$ between the RPM ceiling and the top of the vehicle passing through the RPM and a known height $h_c$ of the ceiling (so that $h=h_c-h_d$). Such a distance measuring device provides the measured $h_d$ value to the communication interface 202 of the nuclear radiation monitoring apparatus 200. The length of the virtual plane (relative to a predetermined reference point, e.g. ground level) used by the intensity determiner to determine the nuclear radiation intensity parameter values associated with each sub-portion of the vehicle is equal to h. The height of each region representing a respective one of the vehicle portions in the L and R image portions 701L and 701R may be scaled appropriately by the visualisation data generator 205 depending on the value of h.

It will be appreciated that, in reality, the total number of regions and sub-regions into which the L and R image portions are divided may be much greater than that shown in FIG. 6 (only a relatively small number of regions and sub-regions are shown in FIG. 6 for the sake of clarity). For example, for a vehicle with $l_{total}=15$ metres (m) travelling at v=8 km/hr (approximately 2.2 metres per second (m/s)) with a time interval of 300 ms between the start times $t_i$ of successive aggregated capture intervals (each aggregated capture interval also having $t_{interval}=300$ ms, as previously described), there will be (15/2.2)/0.3=23 successive capture intervals (to the nearest whole number). There will therefore be 23 image regions (e.g. corresponding to a respective vehicle portion) shown along the length of the vehicle in each of the L and R image portions (each extending over a portion of length 2.2×0.3=0.66 m of the vehicle). Furthermore, assuming 12 image sub-regions in each image region (as is the case in FIG. 6), this provides a total of 276 image sub-regions.

In an embodiment, the number of image regions may be increased by associating each image region with a respective capture interval (e.g. 100 ms) rather than a respective aggregated capture interval (e.g. 300 ms) in the case that aggregated capture intervals are used. In this case, the intensity parameter associated with each image region is determined based on overlapping aggregated capture intervals. For example, the intensity parameter associated with the image region associated with the first (e.g. 100 ms) capture interval may be set as the intensity parameter of the aggregated first, second and third capture intervals (e.g. to give an aggregated capture interval of 300 ms). Similarly, the intensity parameter associated with the image region associated with the second (e.g. 100 ms) capture interval may be set as the intensity parameter of the aggregated second, third and fourth capture intervals (e.g. to give an aggregated capture interval of 300 ms). The second and third capture intervals are thus used for both the image region associated with the first capture interval and the image region associated with the second capture interval (and thus the aggregated capture intervals used to determine the intensity parameter of these image regions overlap). This allows improved radiation detection of each image region whilst maintaining a sufficiently high resolution of image regions. The intensity parameters associated with the other image regions are determined in a similar way (i.e. with overlapping aggregated capture intervals).

Once the positions of each of the regions and (where present) sub-regions on each of the left and right vehicle images 702L and 702R have been determined, the visualisation data generator 205 determines the visual appearance of each region or (where present) sub-region according to the determined classification of the recorded nuclear radiation for the vehicle and the intensity of that classified nuclear radiation determined for the portion or sub-portion of the vehicle to which that region or sub-region corresponds (as determined by the intensity parameter values determined for that portion or sub-portion).

The intensity of the classified nuclear radiation of each vehicle portion or sub-portion may be shown in any suitable way in the left and right image portions 701L and 701R as long as different nuclear radiation classifications and intensities are distinguishable from each other. For example, each region or sub-region may show colour coded, shaded, numerical or textual data indicative of the intensity of the classified nuclear radiation of the vehicle portion or sub-portion to which that region or sub-region corresponds.

In an embodiment, each region or sub-region is coloured according to a predetermined mapping between a plurality of predetermined nuclear radiation classifications and a plurality of predetermined nuclear radiation intensity ranges and a predetermined colour palette. Thus, for example, a first predetermined colour (e.g. blue) may represent non-NORM gamma-ray emitting materials, a second predetermined colour (e.g. green) may represent NORM gamma-ray emitting materials and a third predetermined colour (e.g. red) may represent a neutron source. Different shades of each of these predetermined colours may then be used to indicate the intensity of the detected nuclear radiation. For example, a lighter shade may represent a lower intensity and a darker shade may represent a higher intensity. Each shade of each predetermined colour is associated with a respective predetermined intensity parameter range such that an image region or sub-region corresponding to a vehicle portion or sub-portion with a detected intensity parameter value falling within that range is coloured with that shade in the displayed visualisation data.

As previously mentioned, in an embodiment, the intensity parameter value of each nuclear radiation classification (e.g. NORM gamma radiation, non-NORM gamma radiation or neutron source) for a given vehicle portion or sub-portion is weighted according to the number of detector panels of the detector 100 which detect nuclear radiation of that classification. Thus, for example, if the detector has a plurality of panels (e.g. panels 100A to 100D) which detect gamma-rays and the intensity parameter value recorded by the $j_{th}$ panel is a non-weighted panel count rate $C_j$, then a weighted panel count rate $N_j$ of the $j^{th}$ panel is given by:

$$N_j = C_j/S$$

Here, S is the sum of the panel count rates of all panels (e.g. from both the L and R sides in FIG. 1) evaluated over all capture intervals at the characteristic energies of the classification concerned. This provides a common divisor for all gamma ray panel count rates of that classification so that the relative contributions from each detector are subsequently represented in the image 700. A similar process is carried out for the neutron panel count rate (in this case, S is the sum of the neutron panel count rates of all panels evaluated over all capture intervals).

It is noted that, if a vehicle contains more than one type of gamma-ray source (e.g. a NORM source and a non-NORM source), then the recorded gamma ray spectrum to be classified will comprise characteristic emission line(s) for each source. The classification and panel count rate determination may therefore be carried out separately for each source (thereby allowing a plurality of different source types to be classified and represented in the image 700 from a single recorded gamma-ray spectrum). In this case, the panel count rate for one source type (e.g. NORM) is determined based on the characteristic emission line(s) of that source type and the panel count rate for another source type (e.g. non-NORM) is determined based on the characteristic emission line(s) of that other source type. A value S is then calculated separately for each source based on the total of the panel count rates over all capture intervals at the energies of the characteristic emission line(s) for that source. It will also be appreciated that, instead of or in addition to classifying the recorded gamma-ray spectrum as simply NORM or non-NORM, data indicative of the known characteristic energies of certain isotopes may be stored in the storage medium 208 and used in the classification and panel count rate determination processes. This allows particular isotopes to be identified and their location indicated in the generated visualisation data (e.g. with a different colour for each isotope). It will be appreciated that data indicative of any known gamma-ray spectral feature may be stored in the storage medium 208 and used for classification and panel count rate determination for that classification in the way as described for NORM and non-NORM classifications (thereby allowing visualisation data to be generated for that classification).

The resulting $N_j$ values on each side are then appropriately combined to provide a total count rate for each vehicle portion (e.g. given by $N_1+N_2$ for the L side of the vehicle in FIG. 1, as previously described) or a weighted fraction of the total count rate for each vehicle sub-portion (e.g. given by $W_{1n}+W_{2n}$ for the $n^{th}$ sub-portion for the L side of the vehicle in FIG. 1, as previously described).

More generally, a total count rate $N_i^{left}$ of the $i^{th}$ vehicle portion on the left side of the vehicle is given by:

$$N_i^{left} = \sum_{j=1}^{L} N_j$$

Here, L is the total number of panels on the left side of the vehicle and $N_j$ is the panel count rate of the $j^{th}$ panel on the left side of the vehicle.

Similarly, a total count rate $N_i^{right}$ of the $i^{th}$ vehicle portion on the right side of the vehicle is given by:

$$N_i^{right} = \sum_{j=1}^{R} N_j$$

Here, R is the total number of panels on the right side of the vehicle and $N_j$ is the panel count rate of the $j^{th}$ panel on the right side of the vehicle.

The values $N_i^{left}$ and $N_i^{right}$ are used when vehicle sub-portions are not used. On the other hand, when vehicle sub-portions are used to provide improved visualisation data (in particular, by providing information about detected radiation intensity in height direction of the vehicle as well as a length direction of the vehicle, thereby enabling more information to be ascertained about the location of a detected radiation source), then the weighted fraction of the total count rate of the $n^{th}$ sub-portion of the $i^{th}$ vehicle portion on the left side of the vehicle, $W_{in}^{left}$, is given by:

$$W_{in}^{left} = \sum_{j=1}^{L} W_{jn}$$

Here, L is the total number of panels on the left side of the vehicle and $W_{jn}$ is the weighted fraction of the panel count rate $N_j$ of the $j^{th}$ panel on the left side of the vehicle for the $n^{th}$ sub-portion.

Similarly, the weighted fraction of the total count rate of the $n^{th}$ sub-portion of the $i^{th}$ vehicle portion on the right side of the vehicle, $W_{in}^{right}$, is given by:

$$W_{in}^{right} = \sum_{j=1}^{R} W_{jn}$$

Here, R is the total number of panels on the right side of the vehicle and $W_{jn}$ is the weighted fraction of the panel count rate $N_j$ of the $j^{th}$ panel on the right side of the vehicle for the $n^{th}$ sub-portion.

In an embodiment, each of the predetermined colours indicating a respective classification has $X_{total}$ shades (e.g. $X_{total}$=255).

When vehicle sub-portions are not used, the shade $X_i^{left}$ used to colour the image region corresponding to the $i^{th}$ vehicle portion in the left image portion 701L is given by:

$X_i^{left} = X_{total} * N_i^{left}$

Similarly, the shade $X_i^{right}$ used to colour the image region corresponding to the $i^{th}$ vehicle portion in the right image portion 701R is given by:

$X_i^{right} = X_{total} * N_i^{right}$

On the other hand, when vehicle sub-portions are used, the shade $X_{in}^{left}$ used to colour the image sub-region corresponding to the $n^{th}$ vehicle sub-portion of the $i^{th}$ vehicle portion in the left image portion 701L is given by:

$X_{in}^{left} = X_{total} * W_{in}^{left}$

Similarly, the shade $X_{in}^{right}$ used to colour the image sub-region corresponding to the $n^{th}$ vehicle sub-portion of the $i^{th}$ vehicle portion in the right image portion 701R is given by:

$X_{in}^{right} = X_{total} * W_{in}^{right}$

Each of $X_i^{left}$, $X_i^{right}$, $X_{in}^{left}$ and $X_{in}^{right}$ are determined to the nearest whole number, for example.

The relative radiation intensity of detected and classified nuclear radiation on the left and right sides of a given vehicle portion or sub-portion can thus be determined easily based on the shading used in the left and right image portions 701L and 701R in the image regions or sub-regions corresponding to that vehicle portion or sub-portion.

In an embodiment, the maximum intensity of the colour palette is set such that statistical noise associated with a zero signal is limited to a narrow part of the low end of the colour range (e.g. the bottom 10%), thereby helping to alleviate the effects of noise in the image 700. For example, values of $N_i^{left}$, $N_i^{right}$, $W_{in}^{left}$ or $W_{in}^{right}$ which are less than a predetermined threshold may be allocated to a single, low intensity shade of the relevant colour. The predetermined threshold may for example be determined with reference to the count rate of the background in the energy regions of the identified isotope. Values which are greater than or equal to the predetermined threshold are then allocated to an appropriate colour shade according to the above equations. It will be appreciated that, although the above equations show a linear relationship between intensity parameter values and colour shade, another, non-linear relationship could also be used. It is noted that the values $N_i^{left}$ t and $W_i^{right}$ remain intensity parameter values. They may be referred to specifically as vehicle portion intensity parameter values. Similarly, the values $W_{in}^{left}$ and $W_{in}^{right}$ remain intensity parameter values. They may be referred to as vehicle sub-portion intensity parameter values.

Figure 7A:
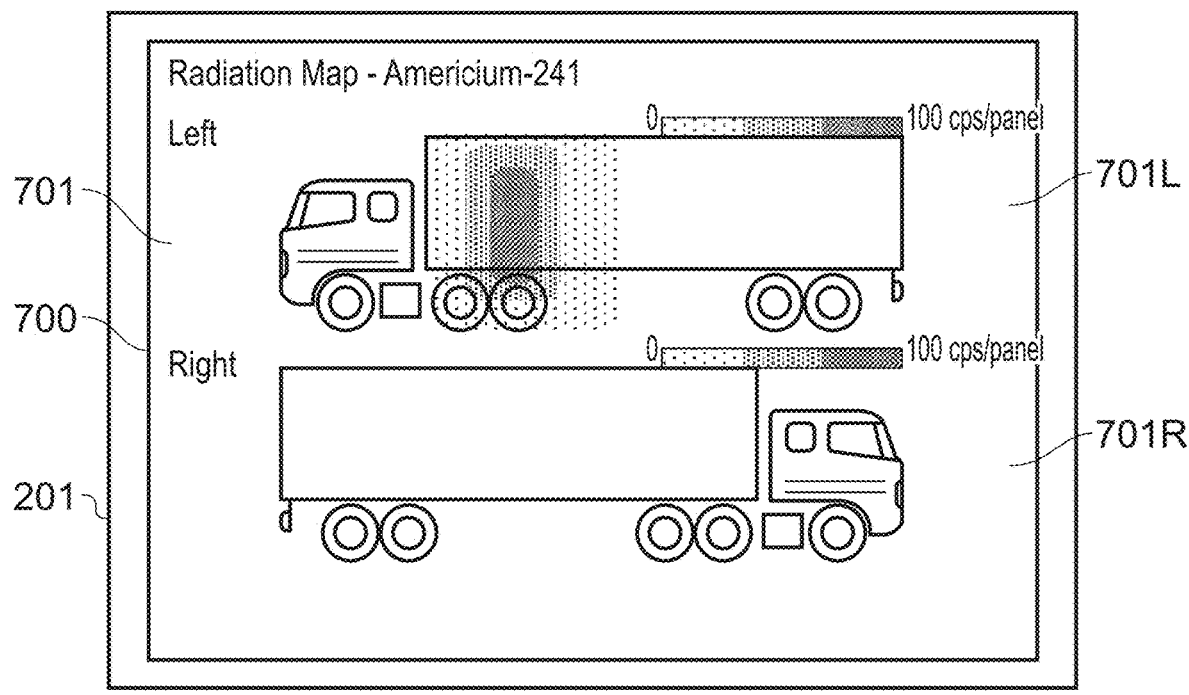
FIGS. 7A and 7B schematically show example visualisation data generated for Americium-241 and Potassium-40.
Figure 7B:
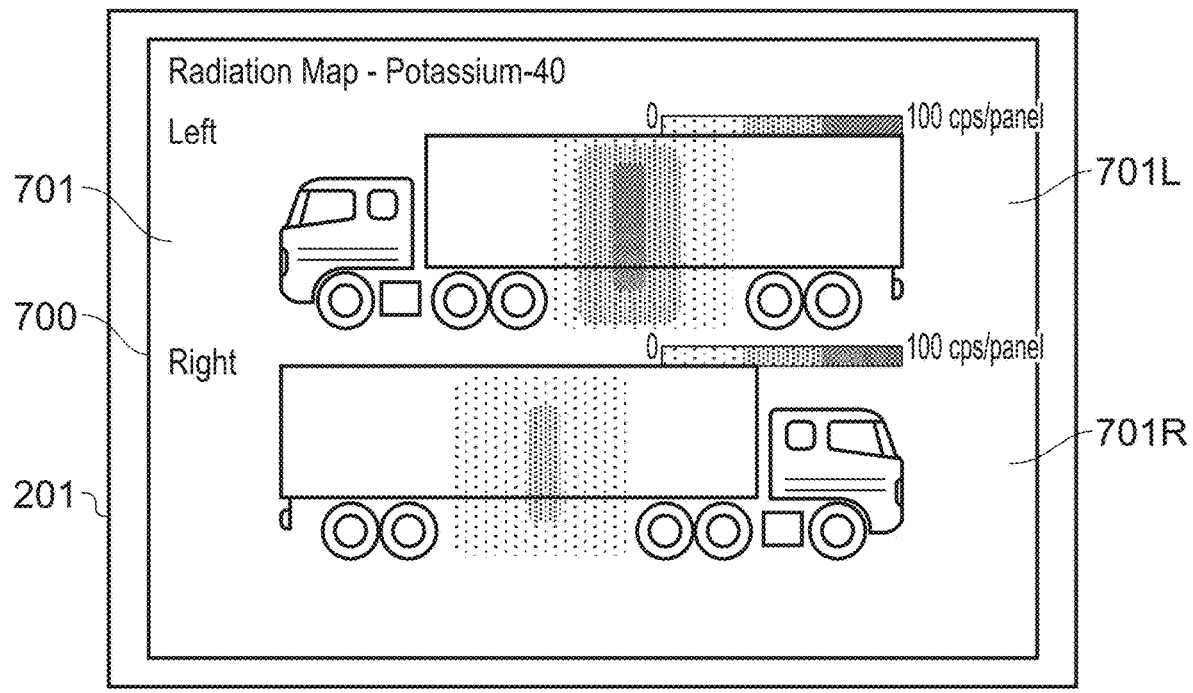

FIGS. 7A and 7B show examples of images 701 generated by the visualisation data generator 205 and output to the display apparatus 201 for display on the electronic display 700 of the display apparatus 201. In these examples (which are representative of real life data), a relatively large number of image regions and sub-regions are shown so that the sub-regions appear in the form of "pixels" each coloured according to the classification and intensity of the detected nuclear radiation detected for the sub-portion of the vehicle to which that sub-region corresponds (it will be appreciated that each sub-region "pixel" may be made up of one or more image pixels of the electronic display 700).

FIG. 7A shows the image 701 generated based on detection by the detector 701 of gamma-ray emitter Americium-241. This is a non-NORM material which emits relatively low energy gamma-rays. The colour of the pixels for which Americium-241 emitted gamma radiation is detected is therefore the colour associated with non-NORM materials (e.g. blue in this example) and the shade of this colour in each pixel depends on the measured intensity of the detected gamma-radiation (with a higher intensity resulting in a darker shade). It can be seen that the highest intensity occurs towards the front of the vehicle on the left hand side. This therefore indicates the approximate location of the Americium-241 within the vehicle. Security personnel investigating the vehicle are therefore able to focus their efforts on this approximate location within the vehicle.

FIG. 7B shows the image 701 generated based on detection by the detector 701 of gamma-ray emitter Potassium-40. This is a NORM material which emits relatively high energy gamma-rays. The colour of the pixels for which Potassium-40 emitted gamma radiation is detected is therefore the colour associated with NORM materials (e.g. green in this example) and the shade of this colour in each pixel depends on the measured intensity of the detected gamma-radiation (with a higher intensity resulting in a darker shade). It can be seen that the highest intensity occurs in the middle of the vehicle towards the left hand side. This therefore indicates the approximate location of the Potassium-40 within the vehicle.

It will thus be appreciated that security personnel viewing the images 701 are able to efficiently and reliably interpret the nuclear radiation data output by the detector 100. In particular, the security personnel are able to determine the nature of detected nuclear radiation (in particular, whether or not it poses a threat) and to determine the approximate position of the source of that detected nuclear radiation within a vehicle in an efficient and reliable manner.

The present technique is particularly beneficial when used as part of a RPM for monitoring nuclear radiation emitted from vehicles or transport containers (e.g. shipping containers, rail freight containers, air freight containers and the like). However, it will be appreciated that the present technique could also be used to monitor nuclear radiation emitted from other objects (e.g. passenger luggage) where there is a need to identify and locate potentially threatening radioactive materials.

Figure 8A:
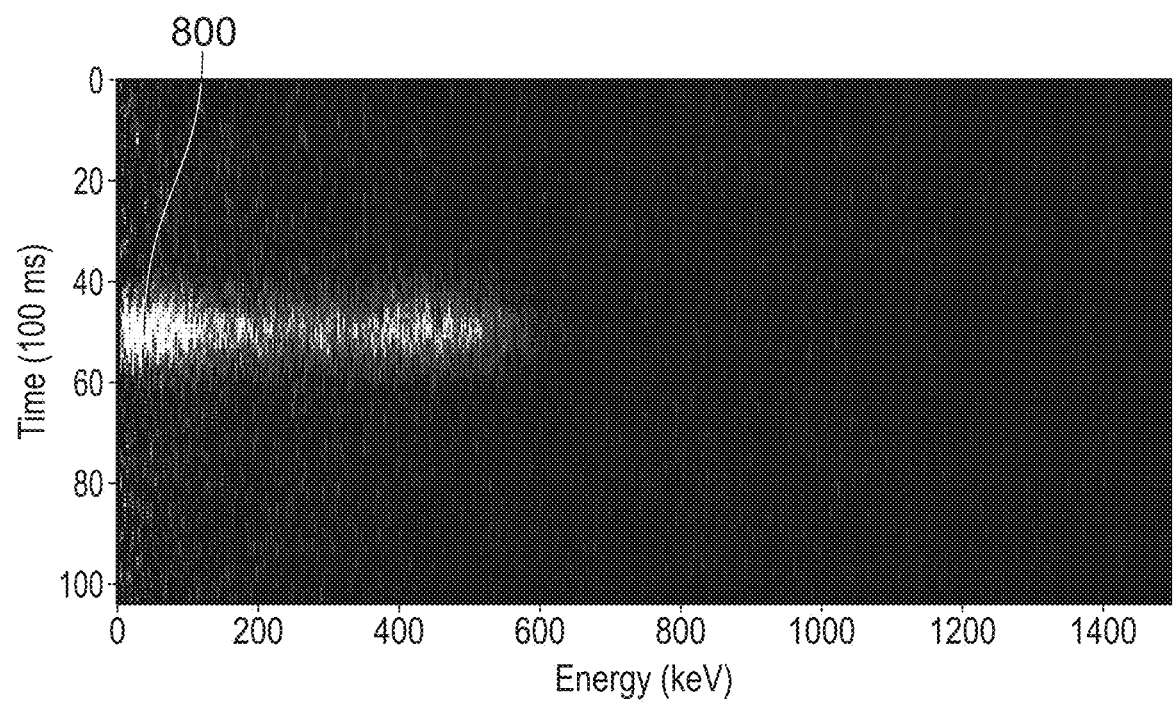
FIGS. 8A and 8B demonstrate the use of spectral deconvolution processing in order to obtain a higher resolution gamma-ray spectrum.
Figure 8B:
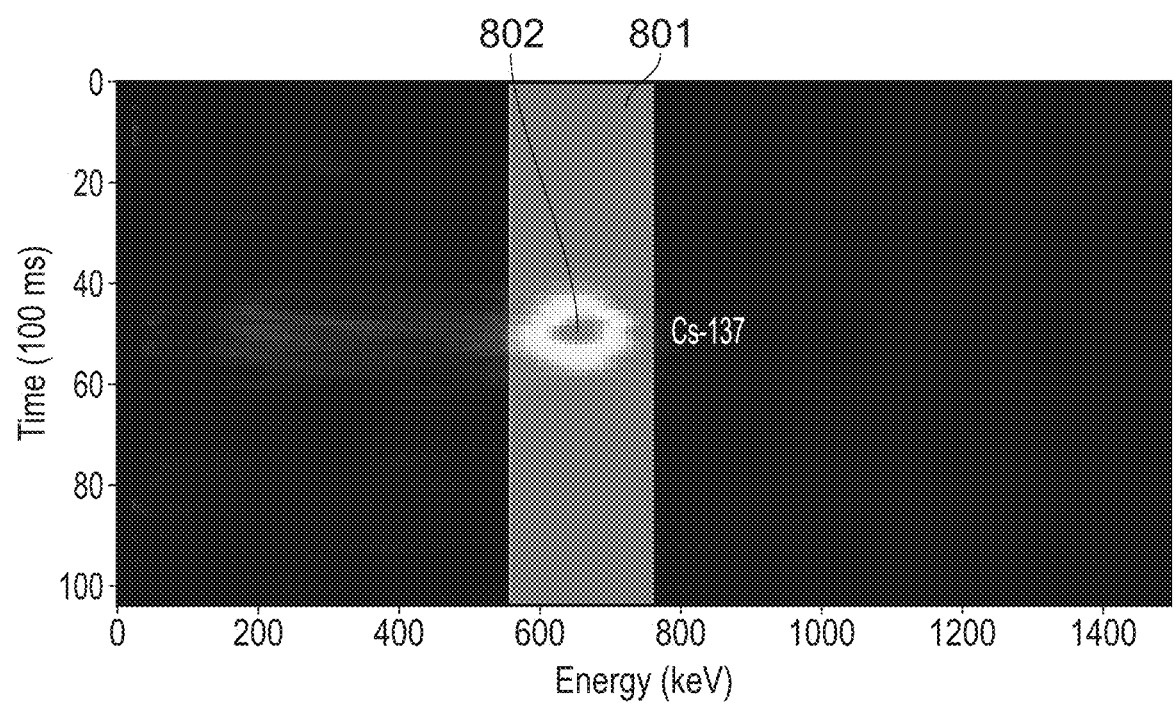

FIGS. 8A and 8B demonstrate the use of spectral deconvolution processing in order to obtain a higher resolution gamma-ray spectrum from a raw (background subtracted) gamma-ray spectrum captured by a set of detector panels comprising PVT detectors. The Figures show "waterfall" plots of the radiation count rate with respect to both time and energy (different radiation count rates being indicated by different shading/colouration). The Figures were captured by recording and combining the recorded gamma-ray spectra of the detectors of all panels as a vehicle containing Cs-137 travelled through the RPM.

FIG. 8A shows a waterfall plot of the recorded gamma-ray spectrum prior to spectral deconvolution. There is a region 800 indicating the presence of a gamma-ray source. However, the radiation count rates at each energy are not very well resolved. FIG. 8B shows a waterfall plot of the same recorded gamma-ray spectrum after spectral deconvolution. The radiation count rates at each energy now have a much higher resolution. In particular, there is now a region 802 within an energy "window" 801 in which the radiation count rate is concentrated around the characteristic energy of Cs-137 (this being 662 keV). This allows the captured gamma-ray spectrum to be reliably classified by the classifier 203 (e.g. Cs-137 would be classified as a non-NORM material or, in the case that data indicative of the characteristic energy of Cs-137 is stored in the storage medium 208 for isotope classification, as Cs-137).

Once the characteristic energies have been identified from the deconvolved spectrum, the panel count rate at each panel at those characteristic energies is determined (thereby allowing appropriate intensity parameter values for use in generating the L and R images to be determined). FIG. 9 shows the panel count rate of a particular panel at the characteristic energy of Cs-137 (this being 662 keV) against time. The presence of the peak 803 indicates the point during the time of transit of the vehicle through the RPM at which the Cs-137 passes the panel. This will be reflected in the image 700 generated using the panel count rate (together with the panel count rates of the other panels), as previously described.

Figure 10:
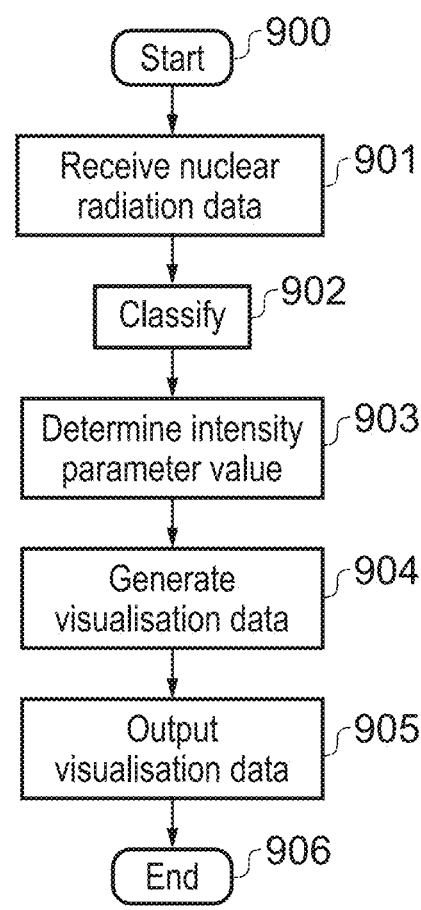
FIG. 10 shows a flow chart showing a method according to an embodiment.

FIG. 10 shows a method carried out by the nuclear radiation monitoring apparatus 200, according to an embodiment. The method starts at step 900. At step 901, the communication interface 202 receives nuclear radiation data. The nuclear radiation data is generated by the nuclear radiation detector 100 and is indicative of nuclear radiation emitted from each of a plurality of portions of an object (e.g. portions 500 to 503 of vehicle 102) and detected by the nuclear radiation detector. At step 902, the classifier 203 classifies the detected nuclear radiation using the nuclear radiation data. At step 903, the intensity determiner 204 determines a value of an intensity parameter indicative of an intensity of the classified nuclear radiation for each portion of the object using the nuclear radiation data. At step 904, the visualisation data generator 205 generates visualisation data indicative of the classification of the classified nuclear radiation and, for each portion of the object, visualisation data indicative of the portion of the object and the determined intensity parameter value of the portion of the object. At step 905, the display output 206 outputs the generated visualisation data for display.

In the above-mentioned embodiments, visualisation data is generated in real time (or near real time) from nuclear radiation data recorded by the nuclear radiation detector 100 as a vehicle travels through the RPM. It will be appreciated, however, that the present technique could also be used to generate visualisation data from nuclear radiation data generated at a previous time and stored in a database (e.g. stored in storage medium 208). This may be useful for training an operator how to use the nuclear radiation monitoring apparatus 200, for example. Numerous modifications and variations of the present disclosure are possible in light of the above teachings. It is therefore to be understood that within the scope of the appended claims, the disclosure may be practiced otherwise than as specifically described herein.

Some embodiments of the present disclosure are defined by the following numbered clauses:

1. A nuclear radiation monitoring apparatus comprising:
    communication circuitry configured to receive nuclear radiation data generated by a nuclear radiation detector, the nuclear radiation data being indicative of nuclear radiation emitted from each of a plurality of portions of an object and detected by the nuclear radiation detector;
    classification circuitry configured to classify the detected nuclear radiation using the nuclear radiation data;
    intensity determination circuitry configured to determine a value of an intensity parameter indicative of an intensity of the classified nuclear radiation for each portion of the object using the nuclear radiation data;
    visualisation data generation circuitry configured to generate visualisation data indicative of the classification of the classified nuclear radiation and, for each portion of the object, visualisation data indicative of the portion of the object and the determined intensity parameter value of the portion of the object; and
    display output circuitry configured to output the generated visualisation data for display.

2. A nuclear radiation monitoring apparatus according to clause 1, wherein:
    the visualisation data comprises an image comprising a plurality of regions each associated with a respective portion of the object; and
    a visual appearance of the region of the image associated with each respective portion of the object is indicative of the classification of the nuclear radiation and the determined intensity parameter value of the portion of the object.

3. A nuclear radiation monitoring apparatus according to clause 2, wherein:
    the region of the image associated with each respective portion of the object is coloured according to a predetermined mapping between a plurality of predetermined classifications and a plurality of predetermined intensity parameter value ranges and a predetermined colour palette.

4. A nuclear radiation monitoring apparatus according to clause 2 or 3, wherein:
the region of the image associated with each respective portion of the object comprises a plurality of sub-regions each associated with a respective sub-portion of the object; and
a visual appearance of the sub-region of the image associated with each respective sub-portion of the object is indicative of an intensity parameter value associated with that sub-portion of the object, the intensity parameter value associated with each sub-portion of the object being calculated based on the intensity parameter value of the portion of the object comprising that sub-portion of the object and a distance between that sub-portion of the object and the nuclear radiation detector.

5. A nuclear radiation monitoring apparatus according to clause 4, wherein:
the sub-region of the image associated with each respective sub-portion of the object is coloured according to a predetermined mapping between a plurality of predetermined classifications and a plurality of predetermined intensity parameter value ranges and a predetermined colour palette.

6. A nuclear radiation monitoring apparatus according to clause 4 or 5, wherein:
the nuclear radiation detector comprises a plurality of nuclear radiation detection portions each positioned differently with respect to the object; and
the intensity parameter value associated with each sub-portion of the object is calculated based on an intensity parameter value of the nuclear radiation detected by each nuclear radiation detection portion for the portion of the object comprising that sub-portion of the object and a position of that sub-portion of the object relative to each nuclear radiation detection portion.

7. A nuclear radiation monitoring apparatus according to any preceding clause, wherein:
the nuclear radiation data received from the nuclear radiation detector is indicative of nuclear radiation emitted separately from each of first and second sides of the object and detected by the nuclear radiation detector; and
the visualisation data is separately indicative of the intensity parameter value of each of the plurality of portions of the object at each of the first and second sides of the object.

8. A nuclear radiation monitoring apparatus according to any preceding clause, wherein the intensity determination circuitry is configured to determine, as the intensity parameter value, a radiation count rate recorded by the nuclear radiation detector.

9. A nuclear radiation monitoring apparatus according to any preceding clause, wherein:
the nuclear radiation detector comprises one or more neutron detectors and the nuclear radiation data comprises a neutron count rate recorded by the one or more neutron detectors;
the classification circuitry is configured to determine, as the nuclear radiation classification, whether or not the detected nuclear radiation has been emitted by a neutron source based on the neutron count rate; and
the intensity determination circuitry is configured to determine the neutron count rate as the intensity parameter value.

10. A nuclear radiation monitoring apparatus according to any preceding clause, wherein:
the nuclear radiation detector comprises one or more gamma-ray detectors and the nuclear radiation data comprises a gamma-ray spectrum recorded by the one or more gamma-ray detectors;
the classification circuitry is configured to determine, as the nuclear radiation classification, a type of material from which the detected nuclear radiation was emitted based on one of more characteristic energies of the gamma-ray spectrum; and
the intensity determination circuitry is configured to determine a gamma radiation count rate of the one or more characteristic energies of the gamma-ray spectrum as the intensity parameter value.

11. A nuclear radiation monitoring apparatus according to clause 10, wherein the material from which the detected nuclear radiation was emitted is determined to be either a naturally occurring radiation material (NORM) or a non-naturally occurring radiation material (non-NORM).

12. A nuclear radiation monitoring apparatus according to any preceding clause, wherein the object is a vehicle or a transport container.

13. A system comprising:
a nuclear radiation monitoring apparatus according to any preceding clause;
a nuclear radiation detector configured to detect nuclear radiation emitted from each of a plurality of portions of an object and to provide nuclear radiation data indicative of the detected nuclear radiation to the communication circuitry of the nuclear radiation monitoring apparatus; and
a display apparatus configured to receive the generated visualisation data from the output circuitry of the nuclear radiation monitoring apparatus and to display the visualisation data.

14. A radiation portal monitor comprising a system according to clause 13.

15. A nuclear radiation monitoring method comprising:
receiving, nuclear radiation data generated by a nuclear radiation detector, the nuclear radiation data being indicative of nuclear radiation emitted from each of a plurality of portions of an object and detected by the nuclear radiation detector;
classifying the detected nuclear radiation using the received nuclear radiation data;
determining a value of an intensity parameter indicative of an intensity of the classified nuclear radiation for each portion of the object using the nuclear radiation data;
generating visualisation data indicative of the classification of the classified nuclear radiation and, for each portion of the object, visualisation data indicative of the portion of the object and the determined intensity parameter value of the portion of the object; and
outputting the generated visualisation data for display.

16. A program for controlling a computer to perform a method according to clause 15.

17. A recording medium storing a program according to clause 16.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed, the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] GB patent GB 2463707
[2] GB patent GB 2504771
[3] Meng, L. J., and D. Ramsden. 2000. "An Inter-Comparison of Three Spectral-Deconvolution Algorithms for Gamma-Ray Spectroscopy." IEEE Transactions on Nuclear Science 47 (4): 1329-36.
[4] U.S. Pat. No. 7,547,887 B2[5] Lo Presti C. A. et al. 2006. "Baseline suppression of vehicle portal monitor gamma count profiles: A characterization study". Nuclear Instruments and Methods in Physics Research A 562 (2006) 281-297.

The invention claimed is:

1. A nuclear radiation monitoring apparatus comprising:
communication circuitry configured to receive nuclear radiation data generated by a nuclear radiation detector, the nuclear radiation data being indicative of nuclear radiation emitted from each of a plurality of portions of an object and detected by the nuclear radiation detector, the nuclear radiation having been emitted from each of the plurality of portions of the object during a respective one of a plurality of capture intervals as the object travelled past the nuclear radiation detector;
classification circuitry configured to classify the detected nuclear radiation by aggregating the nuclear radiation data generated during the plurality of capture intervals, the aggregated nuclear radiation data representing an aggregated gamma radiation spectrum and the classification comprising deconvolving the aggregated gamma radiation spectrum using a first number of deconvolution iterations identifying one or more characteristic energies of the deconvolved aggregated gamma radiation spectrum;
intensity determination circuitry configured to determine a value of an intensity parameter indicative of an intensity of the classified nuclear radiation for each portion of the object using the nuclear radiation data generated during the respective capture interval, the nuclear radiation data generated during each capture interval representing a gamma radiation spectrum, wherein the gamma radiation spectrum of each capture interval is deconvolved using a second number of deconvolution iterations, the second number of deconvolution iterations being less than the first number of deconvolution iterations, and wherein the value of the intensity parameter for each portion of the object corresponds to a count of the deconvolved gamma radiation spectrum of the respective capture interval at the one or more characteristic energies;
visualisation data generation circuitry configured to generate visualisation data indicative of the classification of the classified nuclear radiation and, for each portion of the object, visualisation data indicative of the portion of the object and the determined intensity parameter value of the portion of the object; and
display output circuitry configured to output the generated visualisation data for display;
wherein the visualisation data includes an image of the object comprising a plurality of regions each associated with a respective portion of the object, which image is generated by the visualisation data generation circuitry separately from the nuclear radiation data;
wherein a visual appearance of the region of the image of the object associated with each respective portion of the object is indicative of the classification of the nuclear radiation and the determined intensity parameter value of the portion of the object; and
wherein each of the plurality of regions of the image of the object associated with a respective portion of the object and having a visual appearance indicative of the classification of the nuclear radiation and the determined intensity parameter value of the portion of the object is located on the image of the object at a location corresponding to the location of the portion of the object;
wherein the region of the image associated with each respective portion of the object comprises a plurality of sub-regions each associated with a respective sub-portion of the object;
wherein a visual appearance of the sub-region of the image associated with each respective sub-portion of the object is indicative of an intensity parameter value associated with that sub-portion of the object, the intensity parameter value associated with each sub-portion of the object being calculated based on the intensity parameter value of the portion of the object comprising that sub-portion of the object and a distance between that sub-portion of the object and the nuclear radiation detector;
wherein the nuclear radiation detector comprises a plurality of nuclear radiation detection portions each positioned differently with respect to a portal for the object; and
wherein the intensity parameter value associated with each sub-portion of the object is calculated based on an intensity parameter value of the nuclear radiation detected by each nuclear radiation detection portion for the portion of the object comprising that sub-portion of the object and a position of that sub-portion of the object relative to each nuclear radiation detection portion, the intensity parameter value of each sub-portion of the object being a sum of weighted fractions of a count of the deconvolved gamma radiation spectrum of the respective capture interval at the one or more characteristic energies at each nuclear radiation detection portion, the weighing of each weighted fraction of each nuclear radiation detection portion being determined by projecting the count at the nuclear radiation detection portion onto a virtual plane representing a side of the object according to a position of the sub-portion of the object relative to the nuclear radiation detection portion, and the count at each nuclear radiation detection portion being defined as a fraction of the total count of the deconvolved gamma radiation spectrum at the one or more characteristic energies over the plurality of nuclear radiation detection portions.

2. A nuclear radiation monitoring apparatus according to claim 1, wherein:
the region of the image associated with each respective portion of the object is coloured according to a predetermined mapping between a plurality of predetermined classifications and a plurality of predetermined intensity parameter value ranges and a predetermined colour palette.

3. A nuclear radiation monitoring apparatus according to claim 1, wherein:
the sub-region of the image associated with each respective sub-portion of the object is coloured according to a predetermined mapping between a plurality of predetermined classifications and a plurality of predetermined intensity parameter value ranges and a predetermined colour palette.

4. A nuclear radiation monitoring apparatus according to claim 1, wherein:
the nuclear radiation data received from the nuclear radiation detector is indicative of nuclear radiation emitted separately from each of first and second sides of the object and detected by the nuclear radiation detector; and
the visualisation data is separately indicative of the intensity parameter value of each of the plurality of portions of the object at each of the first and second sides of the object.

5. A nuclear radiation monitoring apparatus according to claim 1, wherein the material from which the detected nuclear radiation was emitted is determined to be either a naturally occurring radiation material (NORM) or a non-naturally occurring radiation material (non-NORM).

6. A nuclear radiation monitoring apparatus according to claim 1, wherein the object is a vehicle or a transport container.

7. A system comprising:
a nuclear radiation monitoring apparatus according to claim 1;
a nuclear radiation detector configured to detect nuclear radiation emitted from each of a plurality of portions of an object and to provide nuclear radiation data indicative of the detected nuclear radiation to the communication circuitry of the nuclear radiation monitoring apparatus; and
a display apparatus configured to receive the generated visualisation data from the output circuitry of the nuclear radiation monitoring apparatus and to display the visualisation data.

8. A radiation portal monitor comprising a system according to claim 7.

9. A nuclear radiation monitoring method comprising:
receiving, nuclear radiation data generated by a nuclear radiation detector, the nuclear radiation data being indicative of nuclear radiation emitted from each of a plurality of portions of an object and detected by the nuclear radiation detector, the nuclear radiation emitted from each of the plurality of portions of the object being detected during a respective one of a plurality of capture intervals as the object travels past the nuclear radiation detector;
classifying the detected nuclear radiation by aggregating the received nuclear radiation data generated during the plurality of capture intervals, the aggregated nuclear radiation data representing an aggregated gamma radiation spectrum and the classifying comprising deconvolving the aggregated gamma radiation spectrum using a first number of deconvolution iterations and identifying one or more characteristic energies of the deconvolved aggregated gamma radiation spectrum;
determining a value of an intensity parameter indicative of an intensity of the classified nuclear radiation for each portion of the object using the nuclear radiation data, generated during the respective capture interval, the nuclear radiation data generated during each capture interval representing a gamma radiation spectrum, wherein the gamma radiation spectrum of each capture interval is deconvolved using a second number of deconvolution iterations, the second number of deconvolution iterations being less than the first number of deconvolution iterations, and wherein the value of the intensity parameter for each portion of the object corresponds to a count of the deconvolved gamma radiation spectrum of the respective capture interval at the one or more characteristic energies;
generating visualisation data indicative of the classification of the classified nuclear radiation and, for each portion of the object, visualisation data indicative of the portion of the object and the determined intensity parameter value of the portion of the object; and
outputting the generated visualisation data for display;
wherein the visualisation data includes an image of the object comprising a plurality of regions each associated with a respective portion of the object, which image is generated by visualisation data generation circuitry separately from the nuclear radiation data;
wherein a visual appearance of the region of the image of the object associated with each respective portion of the object is indicative of the classification of the nuclear radiation and the determined intensity parameter value of the portion of the object; and
wherein each of the plurality of regions of the image of the object associated with a respective portion of the object and having a visual appearance indicative of the classification of the nuclear radiation and the determined intensity parameter value of the portion of the object is located on the image of the object at a location corresponding to the location of the portion of the object;
wherein the region of the image associated with each respective portion of the object comprises a plurality of sub-regions each associated with a respective sub-portion of the object;
wherein a visual appearance of the sub-region of the image associated with each respective sub-portion of the object is indicative of an intensity parameter value associated with that sub-portion of the object, the intensity parameter value associated with each sub-portion of the object being calculated based on the intensity parameter value of the portion of the object comprising that sub-portion of the object and a distance between that sub-portion of the object and the nuclear radiation detector;

wherein the nuclear radiation detector comprises a plurality of nuclear radiation detection portions each positioned differently with respect to a portal for the object; and the intensity parameter value associated with each sub-portion of the object is calculated based on an intensity parameter value of the nuclear radiation detected by each nuclear radiation detection portion for the portion of the object comprising that sub-portion of the object and a position of that sub-portion of the object relative to each nuclear radiation detection portion, the intensity parameter value of each sub-portion of the object being a sum of weighted fractions of a count of the deconvolved gamma radiation spectrum of the respective capture interval at the one or more characteristic energies at each nuclear radiation detection portion, the weighing of each weighted fraction of each nuclear radiation detection portion being determined by projecting the count at the nuclear radiation detection portion onto a virtual plane representing a side of the object according to a position of the sub-portion of the object relative to the nuclear radiation detection portion, and the count at each nuclear radiation detection portion being defined as a fraction of the total count of the deconvolved gamma radiation spectrum at the one or more characteristic energies over the plurality of nuclear radiation detection portions.

10. A computer program product comprising a non-transitory digital storage recording medium storing a program wherein the computer program product includes code that, when executed by a computer, causes the computer to perform the method according to claim 9.

* * * * *